(12) United States Patent
Couillet et al.

(10) Patent No.: US 7,427,583 B2
(45) Date of Patent: Sep. 23, 2008

(54) AQUEOUS FRACTURING FLUID

(75) Inventors: Isabelle Couillet, Cambridge (GB); Trevor Hughes, Cambridge (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 376 days.

(21) Appl. No.: 10/497,376

(22) PCT Filed: Dec. 20, 2002

(86) PCT No.: PCT/GB02/05833

§ 371 (c)(1),
(2), (4) Date: Dec. 10, 2004

(87) PCT Pub. No.: WO03/056130

PCT Pub. Date: Jul. 10, 2003

(65) Prior Publication Data

US 2005/0107503 A1    May 19, 2005

(30) Foreign Application Priority Data

Dec. 22, 2001 (GB) .................................. 0130880.8

(51) Int. Cl.
*C09K 8/68* (2006.01)
(52) U.S. Cl. .................. 507/211; 507/209; 507/222; 507/240; 524/533; 524/535
(58) Field of Classification Search ................ 524/533, 524/535; 507/209, 211, 222, 240
See application file for complete search history.

(56) References Cited

U.S. PATENT DOCUMENTS

| | | | |
|---|---|---|---|
| 3,081,619 A | 3/1963 | Pappas | |
| 4,266,610 A | 5/1981 | Meister | |
| 4,432,881 A | 2/1984 | Evani | |
| 4,541,935 A | 9/1985 | Constien et al. | |
| 4,615,825 A | 10/1986 | Teot et al. | |
| 4,695,389 A | 9/1987 | Kubala | |
| 4,725,372 A | 2/1988 | Teot et al. | |
| 4,735,731 A | 4/1988 | Rose et al. | |
| 4,975,482 A | 12/1990 | Peiffer | |
| 5,036,136 A | 7/1991 | Peiffer | |
| 5,551,516 A | 9/1996 | Norman et al. | |
| 5,566,760 A | 10/1996 | Harris | |
| 5,964,295 A | 10/1999 | Brown et al. | |
| 5,979,555 A | 11/1999 | Gadberry et al. | |
| 6,194,356 B1 | 2/2001 | Jones et al. | |
| 6,232,274 B1 | 5/2001 | Hughes et al. | |
| 2001/0020531 A1 | 9/2001 | Varadaraj et al. | |

FOREIGN PATENT DOCUMENTS

| CA | 1 298 697 C | 4/1992 |
|---|---|---|
| EP | 0 835 983 A2 | 4/1998 |
| EP | 0 835 983 A3 | 3/1999 |
| WO | 87/01758 A1 | 3/1987 |
| WO | 01/77487 A2 | 10/2001 |
| WO | 02/064946 A1 | 8/2002 |
| WO | 02/070862 A1 | 9/2002 |

OTHER PUBLICATIONS

Thuresson et al. J. Phys. Chem. B (1997), 101, 6450-6459.*
Thuresson et al. J. Phys. Chem. B (1997), 101, 6450-6458.*
Anthony et al, Bulk and surface behavior of cationic guars in solutions of oppositely charged surfactants, Langmuir, vol. 14, 1998, pp. 6086-6095.
Biggs et al, Effect of surfactant on the solution properties of hydrophobically modified polyacrylamide, Langmuir, vol. 8, 1992, pp. 838-847.
Chase et al, Clear fracturing fluids for increased well productivity, Schlumberger Oilfield Review, Autumn 1997, pp. 20-33.
Hill et al, Aqueous solution properties of hydrophobically associating copolymers, Progress in Colloid & Polymer Science, vol. 84, 1991, pp. 61-65.
Iliopoulos, Association between hydrophobic polyelectrolytes and surfactants, Current Opinion in Colloid and Interface Science, vol. 3, No. 5, 1998, pp. 493-498.
Kästner et al, Interactions between quaternary ammonium surfactant oligomers and and water-soluble modified guars, Journal of Colloid and Interface Science, vol. 218, 1999, pp. 468-479.
Panmai et al, Rheology of hydrophobically modified polymers with spherical and rod-like surfactant micelles, Colloids and Surfaces A, vol. 147, 1999, pp. 3-15.
Plusquellec et al, An efficient acylation of free glycosylamines for the synthesis of N-glycosyl amino acids and N-glycosidic surfactants for membrane studies, J. Corbohydrate Chemistry, vol. 13(5), 1994, pp. 737-751.
Yalpani et al, Some chemical and analytical aspects of polysaccharide modifications. 3. Formation of branched-chain, soluble chitosan derivatives, Macromolecules, vol. 17, 1984, pp. 272-281.
Winnik et al, Associative polymers in aqueous solution, Current Opinion in Colloid and Interface Science, vol. 2, 1997, pp. 424-436.

* cited by examiner

*Primary Examiner*—Helen L. Pezzuto
(74) *Attorney, Agent, or Firm*—Steven Gahlings, Esq.; Jim McAleenan, Esq.; Jody Lynn DeStefanis Esq.

(57) ABSTRACT

The invention concerns an aqueous viscoelastic fracturing fluid for use in the recovery of hydrocarbons. According to the invention, the fluid comprises a viscoelastic surfactant and a hydrophobically-modified polymer wherein the concentration of the hydrophobically-modified polymer is comprised between its overlap concentration c* and its entanglement concentration $c_e$.

21 Claims, 12 Drawing Sheets

AQUEOUS FRACTURING FLUID

The present invention concerns an aqueous fracturing fluid for use in the recovery of hydrocarbons.

BACKGROUND OF THE INVENTION

Hydrocarbons, such as oil or natural gas, are obtained from hydrocarbon-bearing subterranean geologic formations by drilling a wellbore that provides a partial flow path allowing said hydrocarbons to reach the surface. Hydrocarbons migrate via flow paths connecting a reservoir within the formation and the wellbore.

However, impeded flow paths may lead to an insufficient hydrocarbon production. In such case, various techniques are used to stimulate the hydrocarbon production. Amongst these techniques, it is common to inject specialised fluids via the wellbore into the formation at sufficient pressures to create fractures in the formation rocks. Thereby, channels are created through which the hydrocarbons may more readily flow into the wellbore. The latter technique is referred to as fracturing or hydraulic fracturing and the specialised fluids used in said technique are referred to fracturing fluids.

Ideally, fracturing fluids should impart a minimal pressure drop in the pipe within the wellbore during placement and have an adequate viscosity to carry proppant material that prevents the fracture from closing. Moreover, said fracturing fluids should have a minimal leak-off rate to avoid fluid migration into the formation rocks so that, notably, the fracture can be created and propagated and should degrade so as not to leave residual material that may prevent accurate hydrocarbons to flow into the wellbore.

PRIOR ART

Early fracturing fluids were constituted of viscous or gelled oil but, with the understanding that formation damage due to water may not be as important as originally thought, aqueous fracturing fluids mainly consisting of "linear" polymeric gels comprising guar, guar derivatives or hydroxyethyl cellulose were introduced. In order to attain a sufficient fluid viscosity and thermal stability in high temperature reservoirs, linear polymer gels were partially replaced by cross-linked polymer gels such as those crosslinked with borate, zirconate or titanate ions. However, as it became apparent that crosslinked polymer gel residues might damage the permeability of hydrocarbon bearing formations, fluids with a lower polymer content and foamed fluids were introduced. Also, methods were introduced to improve the clean-up of polymer-based fracturing fluids. These included advanced breaker technology.

More recently, polymer-free aqueous fracturing fluids based on viscoelastic surfactants were developed. The principal advantages of viscoelastic surfactant fluids are ease of preparation, minimal formation damage and high retained permeability in the proppant pack. Viscoelastic surfactant fluids are disclosed, notably, in the patents published under the numbers U.S. Pat. No. 4,615,825, U.S. Pat. No. 4,725,372, U.S. Pat. No. 4,735,731, CA-1298697, U.S. Pat. No. 5,551,516, U.S. Pat. No. 5,964,295, U.S. Pat. No. 5,979,555 and U.S. Pat. No. 6,232,274. One well-known polymer-free aqueous fracturing fluid comprising a viscoelastic surfactant, which has been commercialised by the company group Schlumberger under the trademark ClearFRAC™, is a mixture of a quaternary ammonium salt, the N-erucyl-N,N-bis(2-hydroxyethyl)-N-methyl ammonium chloride, with isopropanol and brine, said brine preferably including 3% by weight of ammonium chloride and 4% by weight of potassium chloride. The viscoelastic surfactant molecules, present at a sufficient concentration, aggregate into overlapping worm- or rod-like micelles, which confer the necessary viscosity to the fluid to carry the proppant during fracturing.

Under the flow conditions experienced during pumping and flow down the wellbore, such viscoelastic surfactant based fluids impart a relatively low friction pressure, which is an advantage in applications involving the use of coiled tubing. In addition, viscoelastic surfactant based fluids are "responsive" in that they degrade to a low viscosity fluid by contact and interaction with formation fluids, in particular hydrocarbons, during backflow from the reservoir to the wellbore.

On the other hand, the leak-off rate of viscoelastic surfactant based fracturing fluids can be high, which tends to restrict their application in hydrocarbon bearing formations wherein the permeability of the formation rocks is low. In addition, particularly at high temperatures, the use of high concentrations of viscoelastic surfactant is necessary to meet operational specifications and this can increase the cost of the fracturing fluid.

The patent published under the number U.S. Pat. No. 4,432,881 entitled "Water-Dispersible Hydrophobic Thickening Agent" and the PCT application published under the number WO 87/01758 entitled "Hydraulic Fracturing Process and Compositions" disclose fracturing fluids comprising non-ionic surfactants and hydrophobically-modified polymers. However, these documents do not refer to viscoelastic surfactants or to the responsiveness of said fluids to hydrocarbons. Hydrophobically-modified polymers are added, together with other compounds, in various concentrations, for the sole purpose of enhancing the viscosity of the fluids. Also, the patent published under the number U.S. Pat. No. 5,566,760 entitled "Method of Using a Foamed Fracturing Fluid" discloses a fracturing fluid comprising surfactants and hydrophobically-modified polymers. In these fluids, surfactant molecules form the interface between gas bubbles and the polymer molecules that form a polymeric network similar to those of the pure polymeric fluids. Still, there is no mention of viscoelastic surfactants or of the responsiveness of the fluids to hydrocarbons.

SUMMARY OF THE INVENTION

Considering the above prior art, one problem that the invention is proposing to solve is to carry out an aqueous viscoelastic fracturing fluid for use in the recovery of hydrocarbons, said fluid being responsive to hydrocarbons and comprising a limited quantity of surfactant and/or polymer, thereby reducing the costs involved in the use of said fluid.

As a solution to the above problem, the invention concerns, in a first aspect, an aqueous viscoelastic fracturing fluid for use in the recovery of hydrocarbons, comprising a viscoelastic surfactant and a hydrophobically-modified polymer, wherein, advantageously, the concentration of the hydrophobically-modified polymer is comprised between, approximately, its overlap concentration $c^*$ and, approximately, its entanglement concentration $c_e$.

In a second aspect, the invention concerns a method for recovering hydrocarbons comprising the following step:

providing an aqueous viscoelastic fracturing fluid comprising a viscoelastic surfactant and a hydrophobically-modified polymer wherein, advantageously, the concentration of the hydrophobically-modified polymer is comprised between, approximately, its overlap concentration c* and, approximately, its entanglement concentration $c_e$; and injecting said fluid into formations rocks in order to fracture said rocks.

The hydrophobically-modified polymer and, notably, pendant hydrophobic chains of said polymer, interact with the surfactant micelles. As a result, a viscoelastic gel structure is created at a viscoelastic surfactant concentration below the typical concentration used for pure viscoelastic surfactant systems, thereby reducing the costs associated with the use of the fluid, said fluid however remaining responsive to hydrocarbons due to the fact that, preferentially, the polymer concentration is not sufficient to form an entangled gel network.

Another important property impacting fluid efficiency and therefore reducing overall cost is that the responsive blend of the invention shows a lower leak-off rate behaviour relative to a responsive fluid based on pure viscoelastic surfactant with equivalent rheology. As for pure viscoelastic surfactant systems, the blend of the invention is also expected to show a lower friction pressure during pumping as compared to pure polymer systems.

Advantageously, the viscoelastic surfactant is a cleavable viscoelastic surfactant and the hydrophobically-modified polymer comprises cleavable pendant hydrophobic cleavable chains.

BRIEF DESCRIPTION OF THE DRAWINGS

The invention will be better understood in the light of the following description of non-limiting and illustrative embodiments, given with reference to the accompanying drawings, in which:

the FIG. 1 illustrates the physical interactions existing between hydrophobically-modified polymers and rod-like surfactant micelles in a fluid according to the invention;

Figure 2:
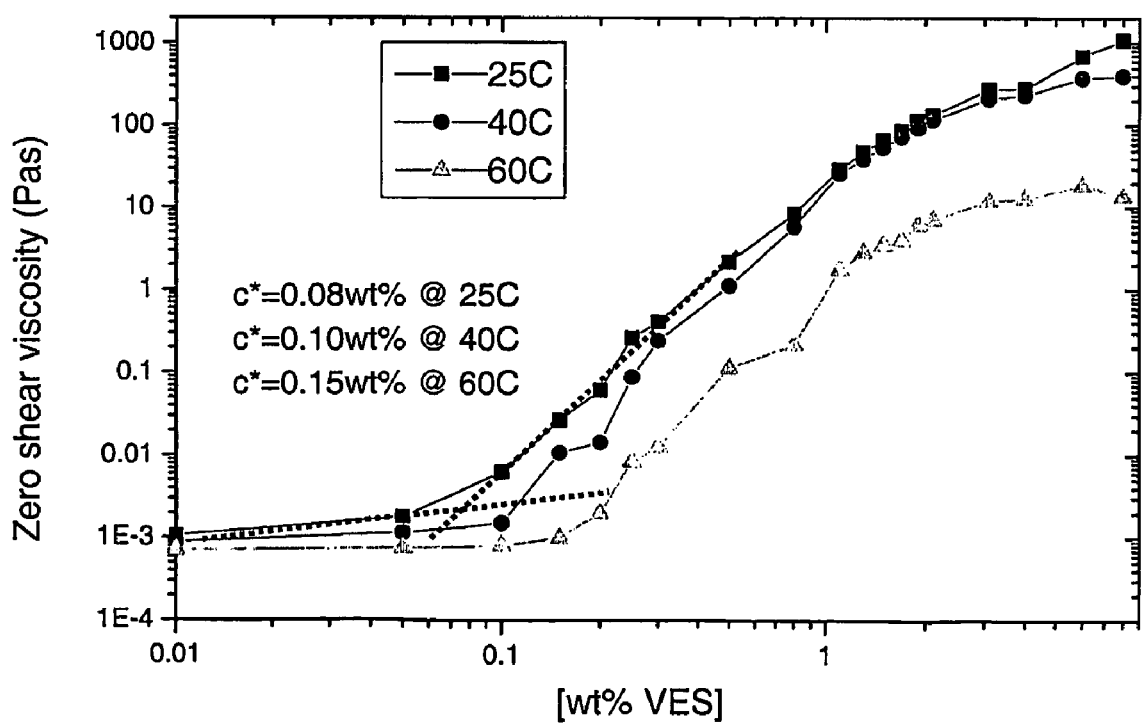
Figure 3:
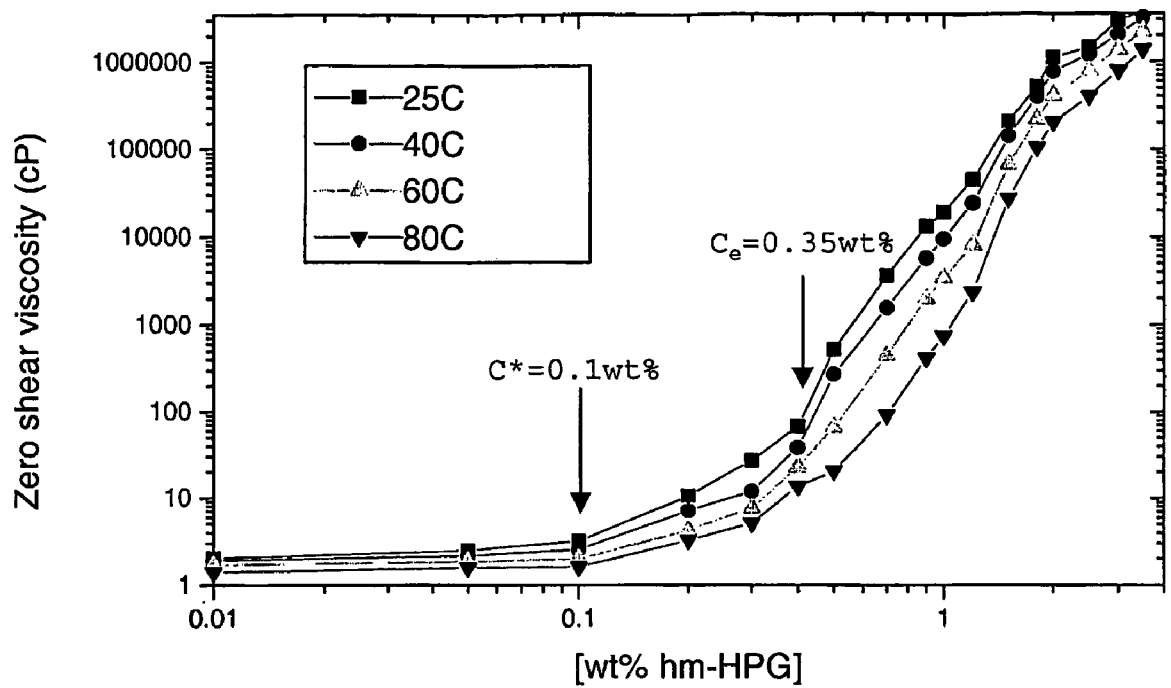
Figure 4:
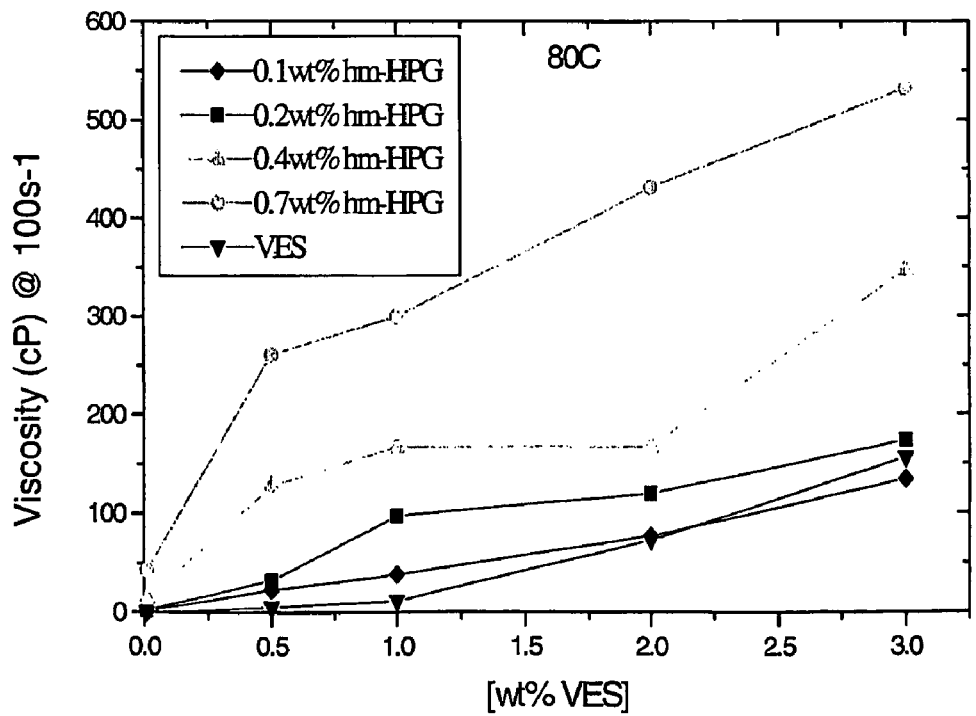
Figure 5:
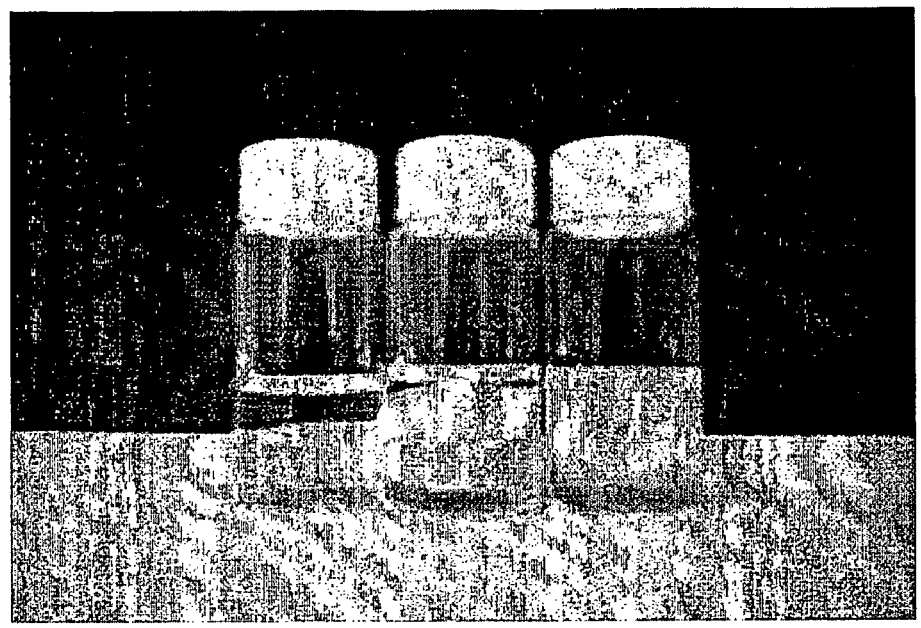
Figure 6:
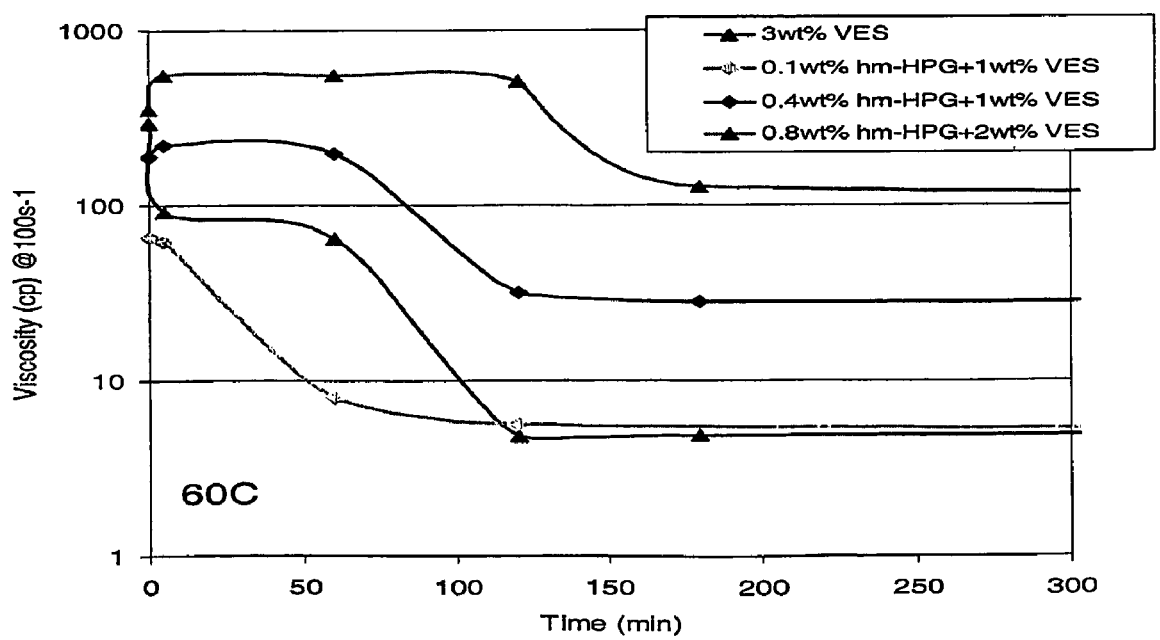
Figure 7:
Figure 8:
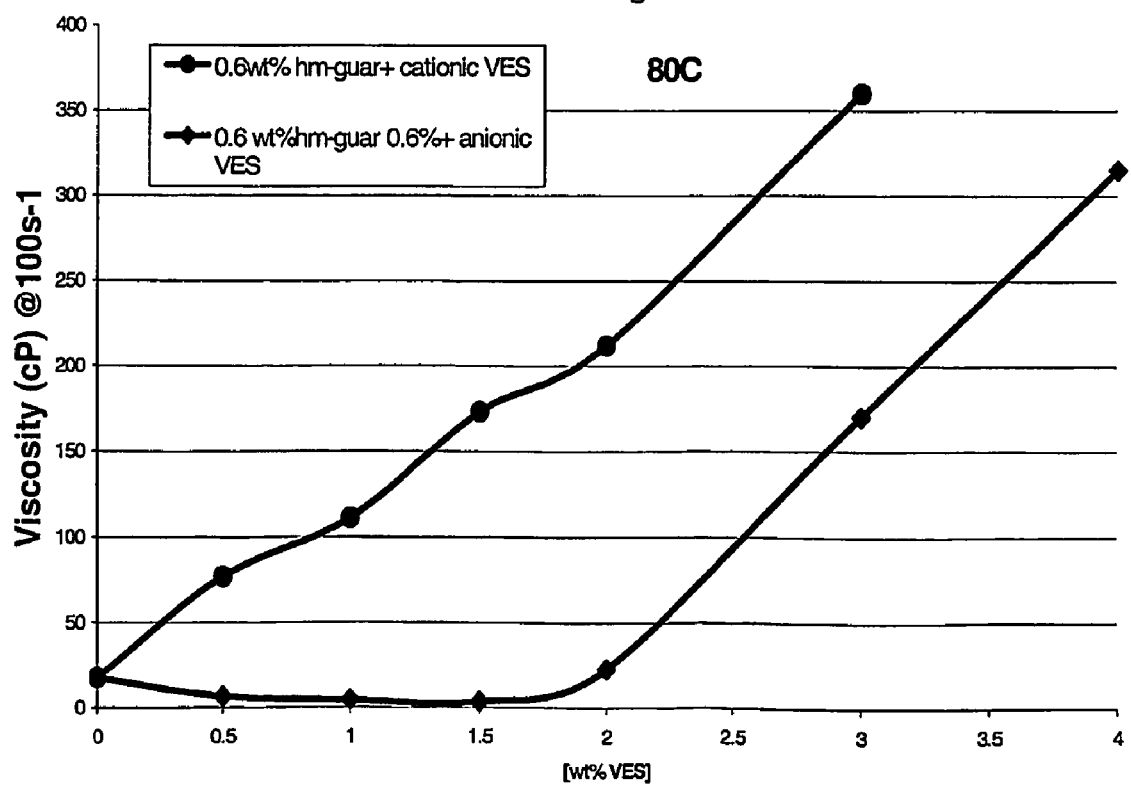
Figure 9:
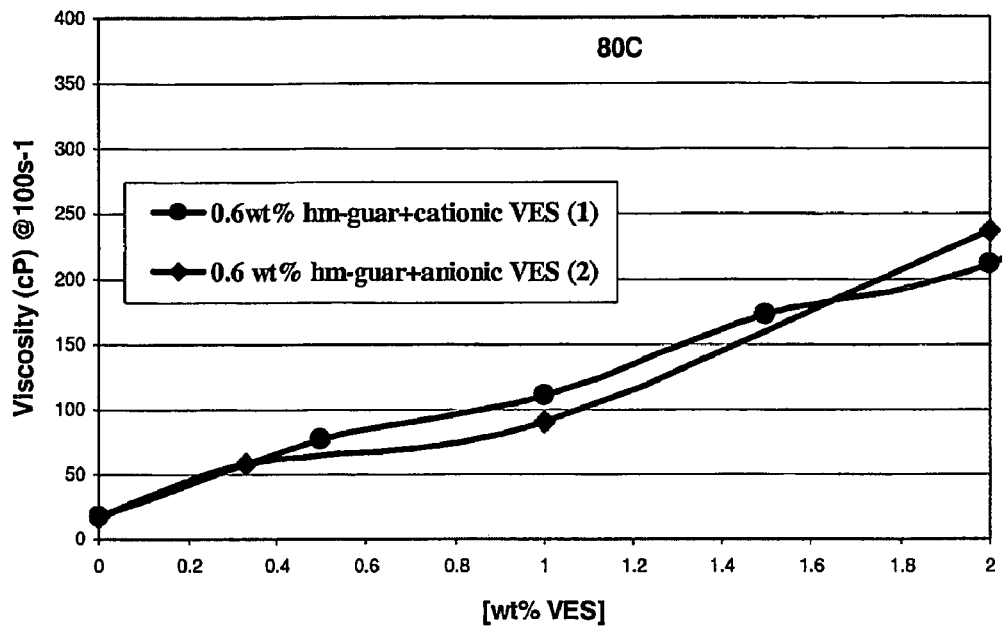
Figure 10:
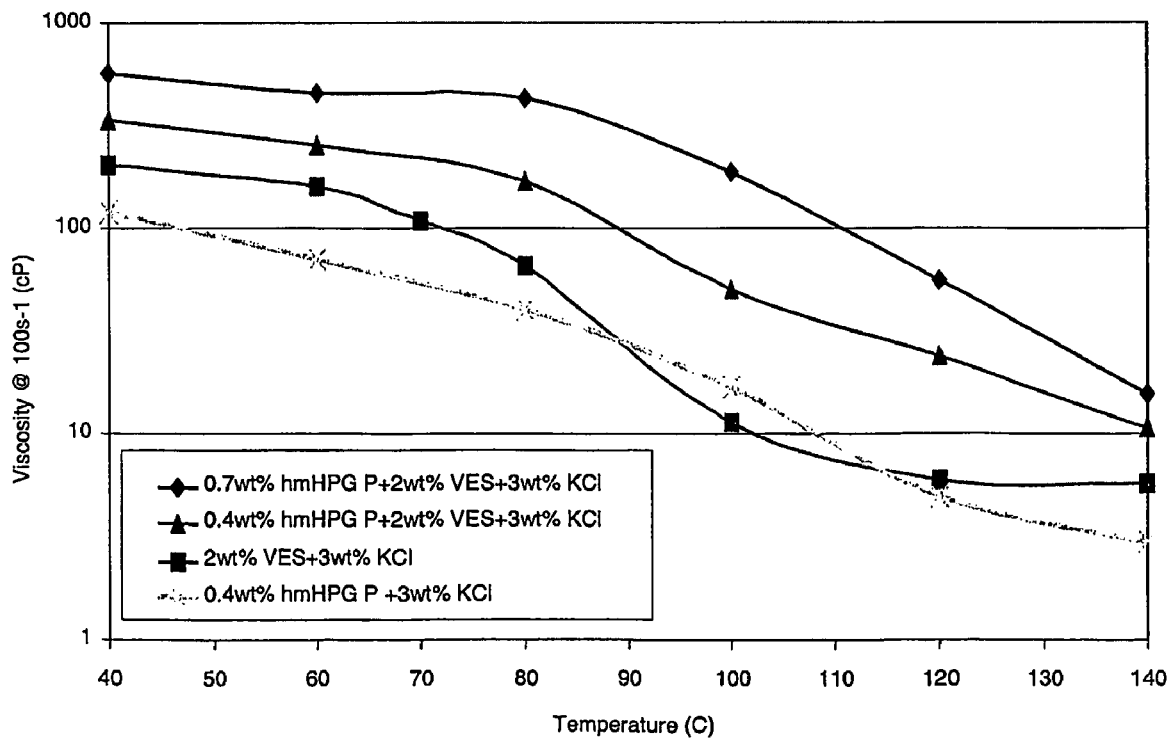
Figure 11:
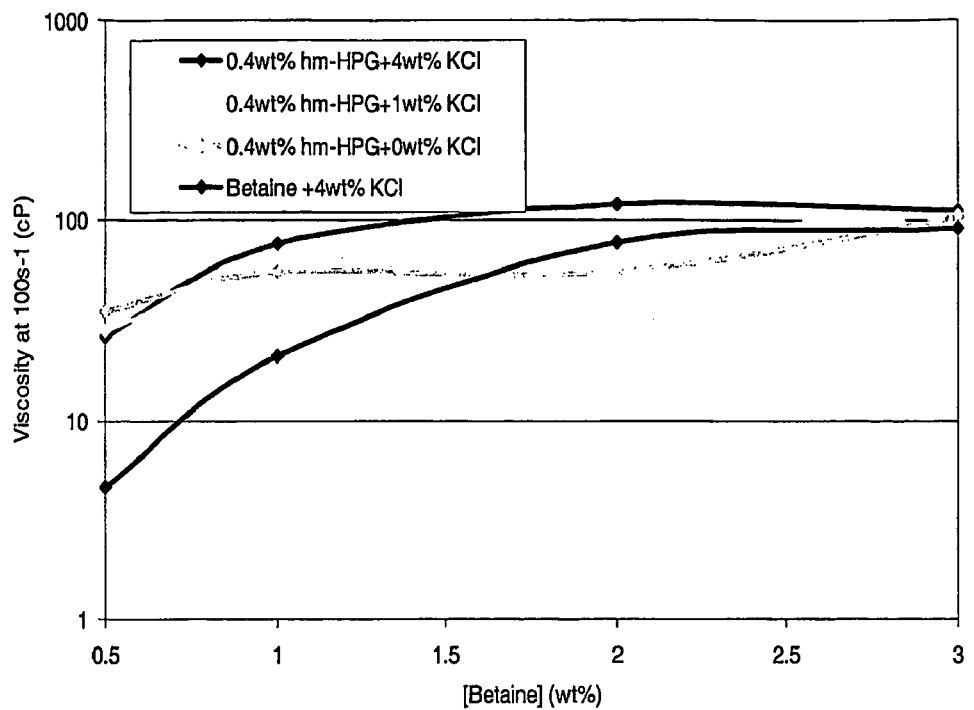
Figure 12:
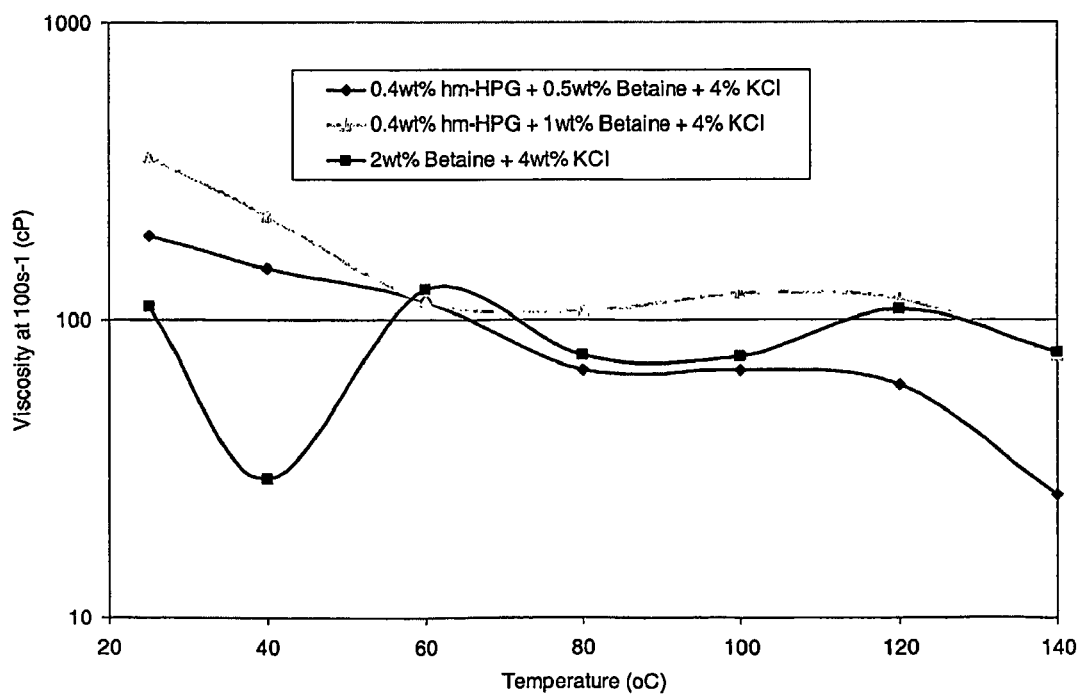
Figure 13:
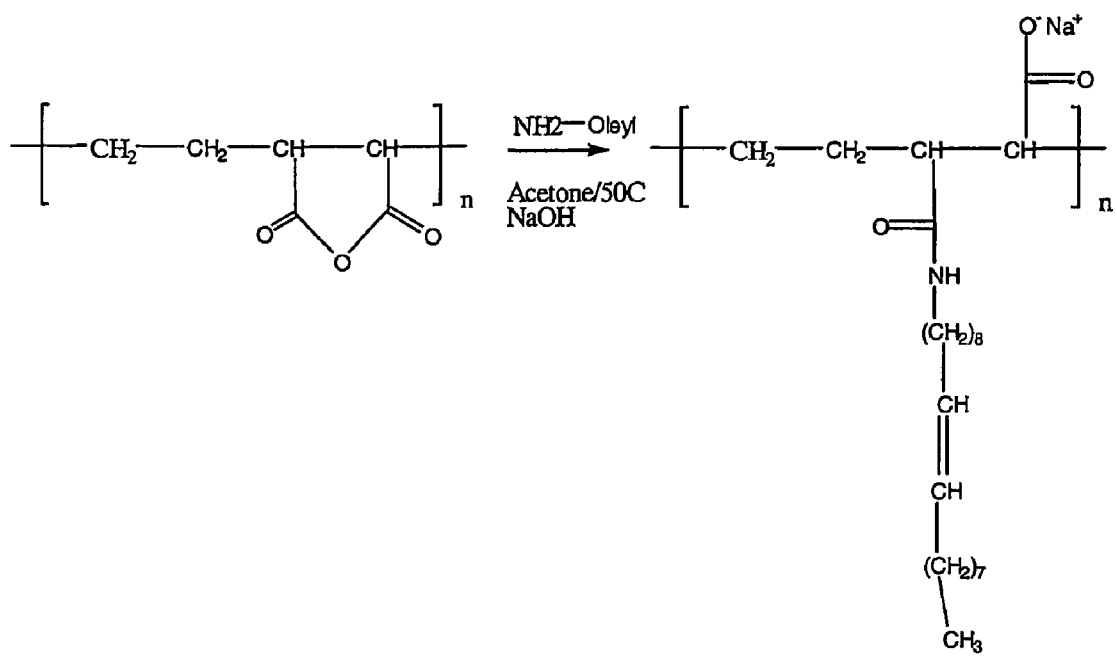
Figure 14:
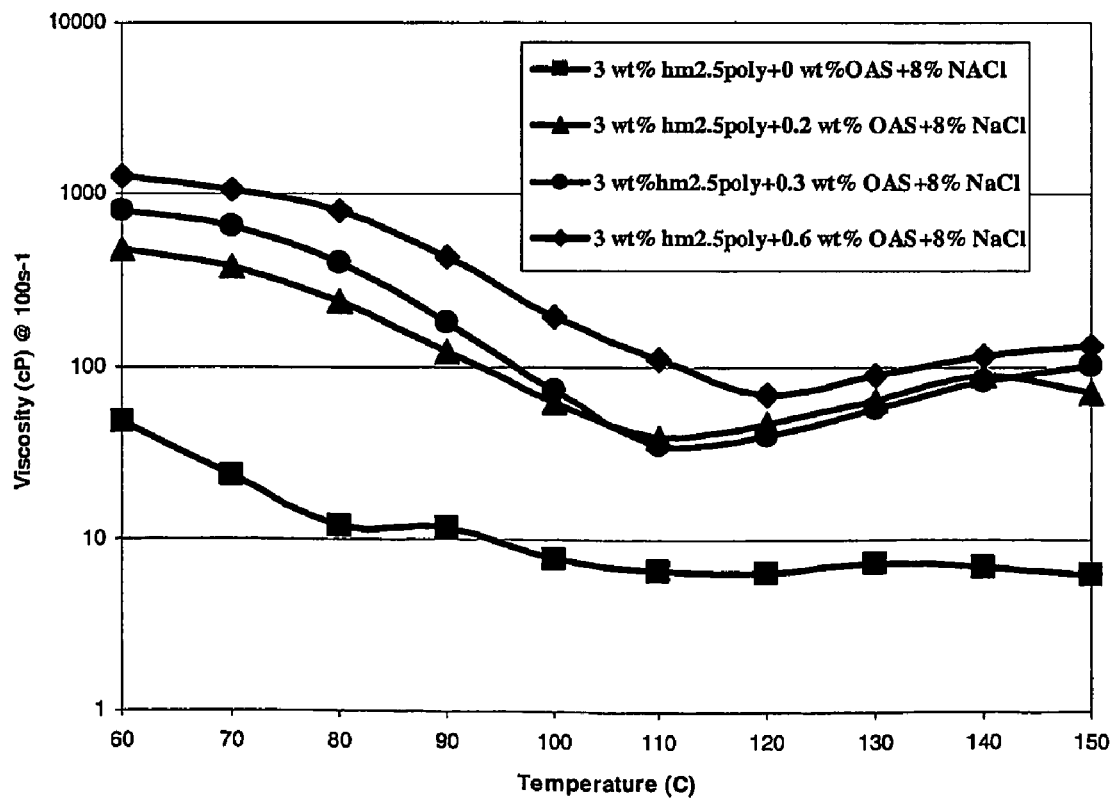
Figure 15:
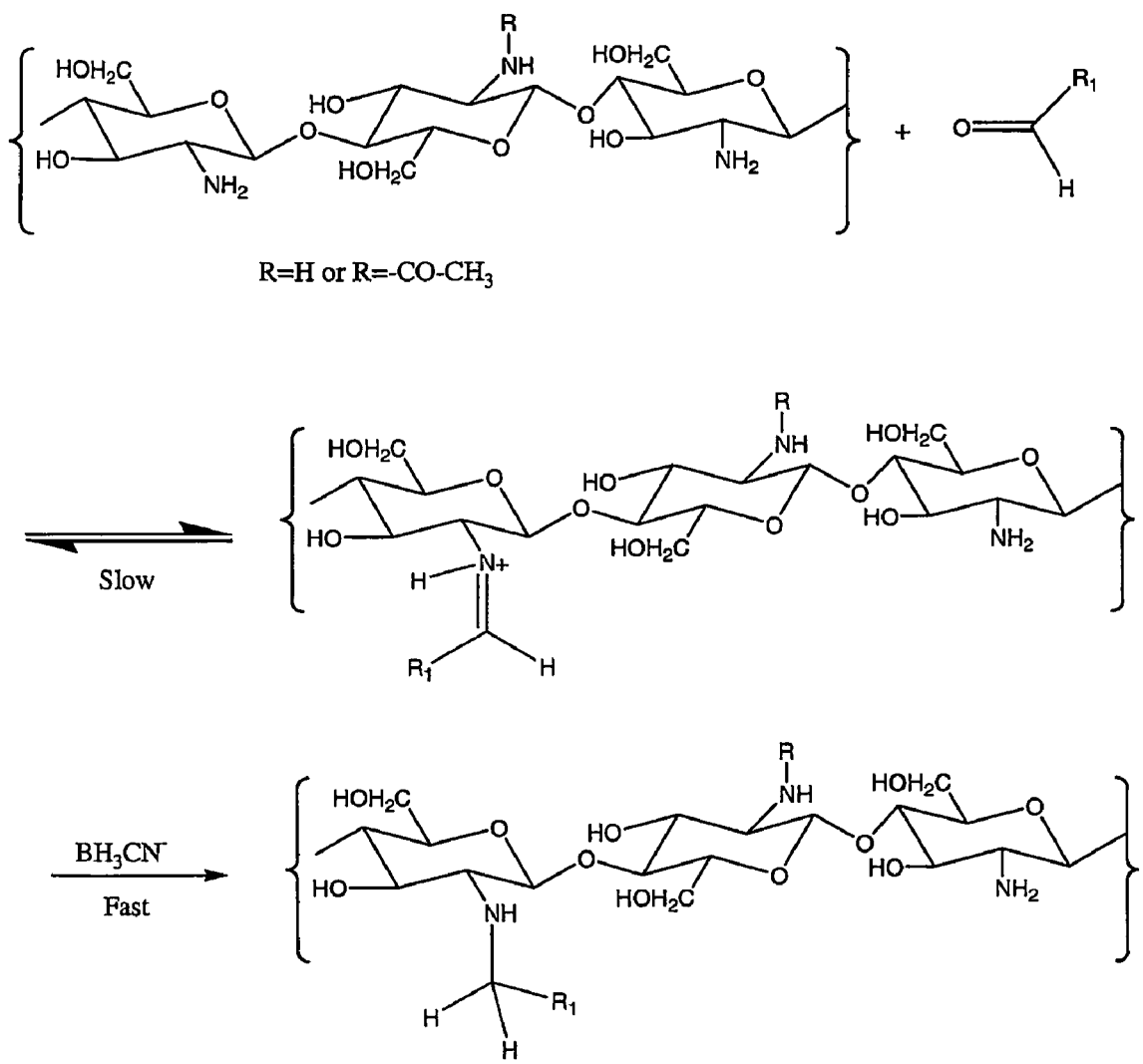
Figure 16A:
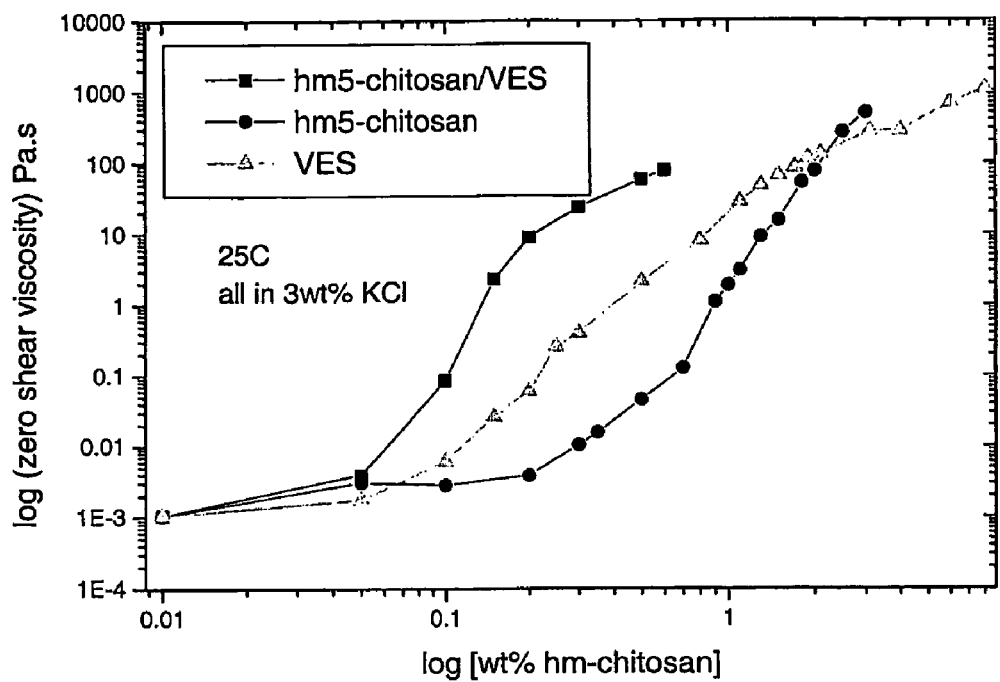
Figure 16B:
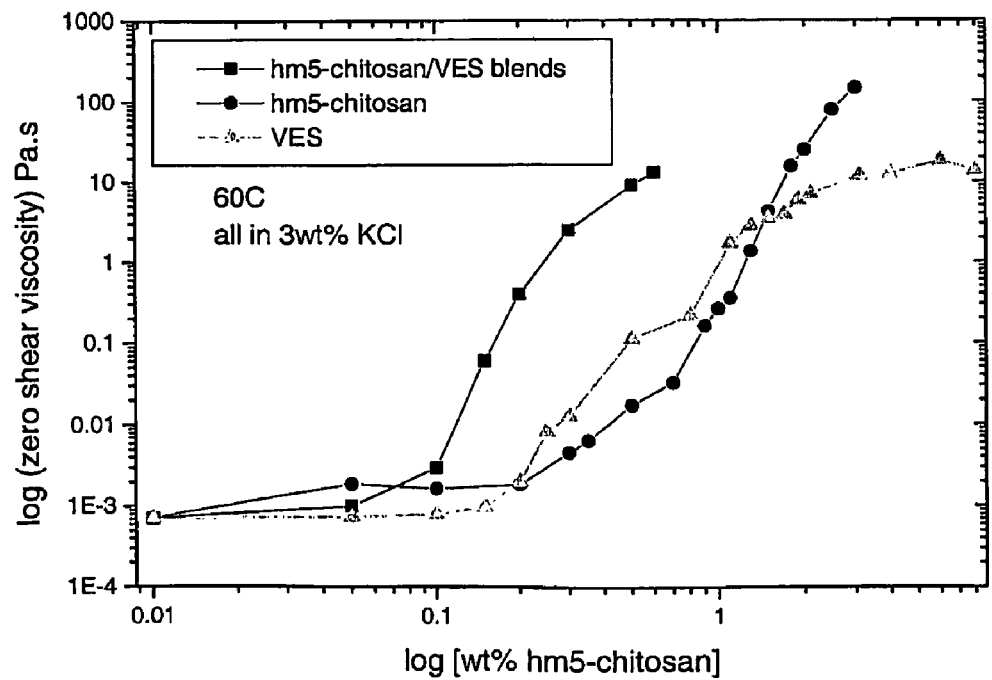
Figure 17:
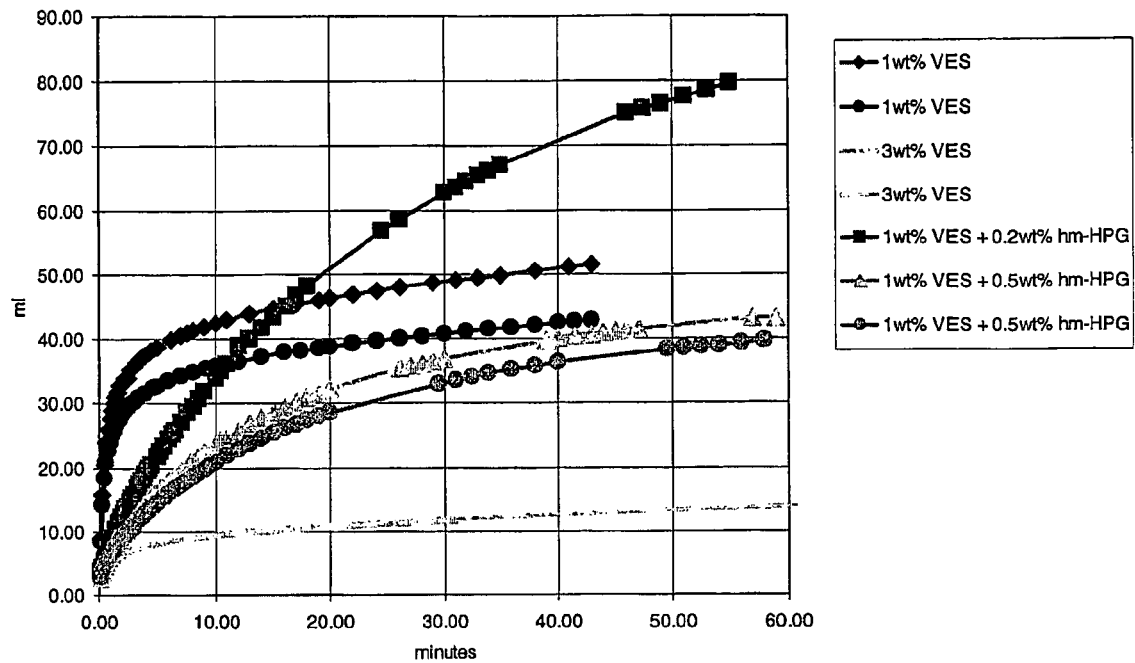
Figure 18:
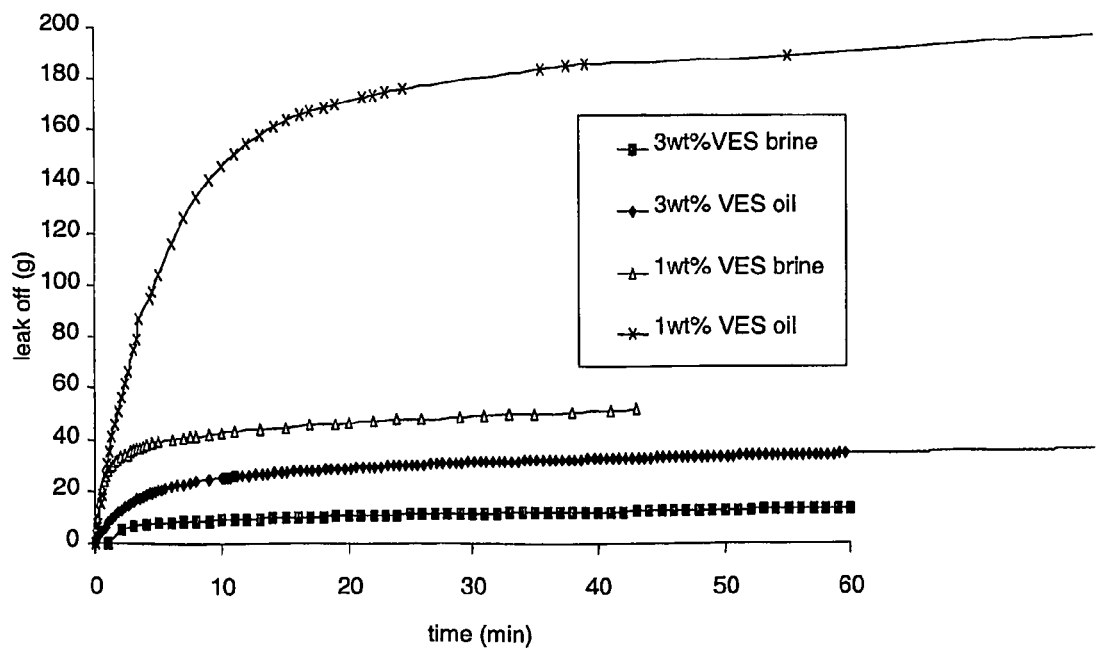
Figure 19:
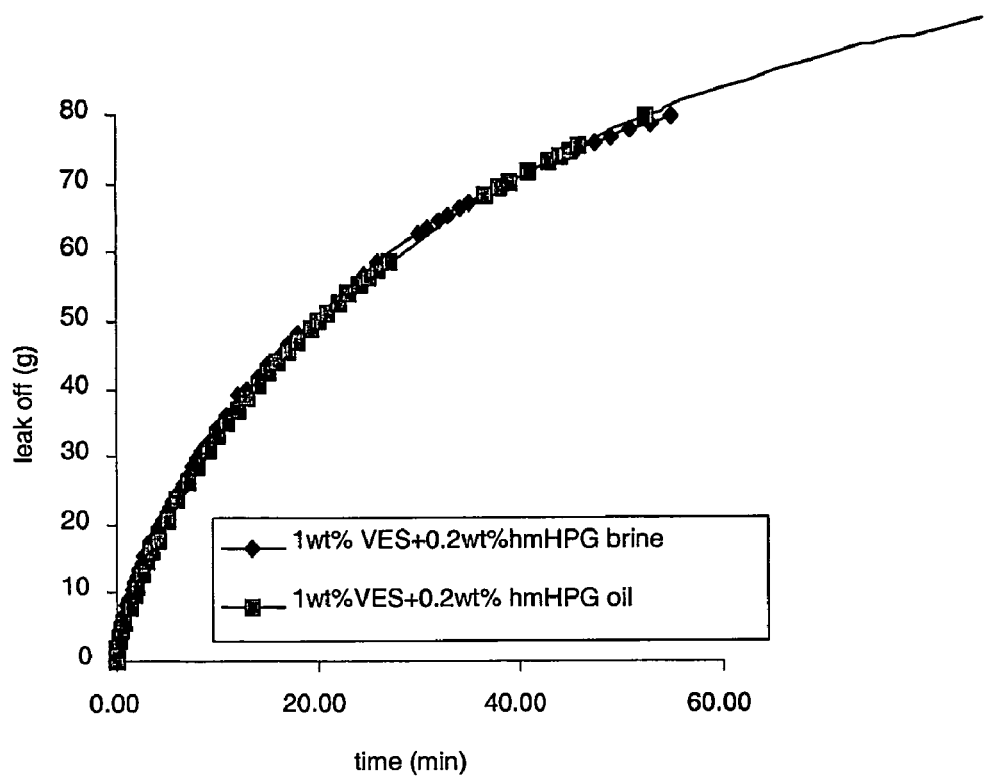
Figure 20:
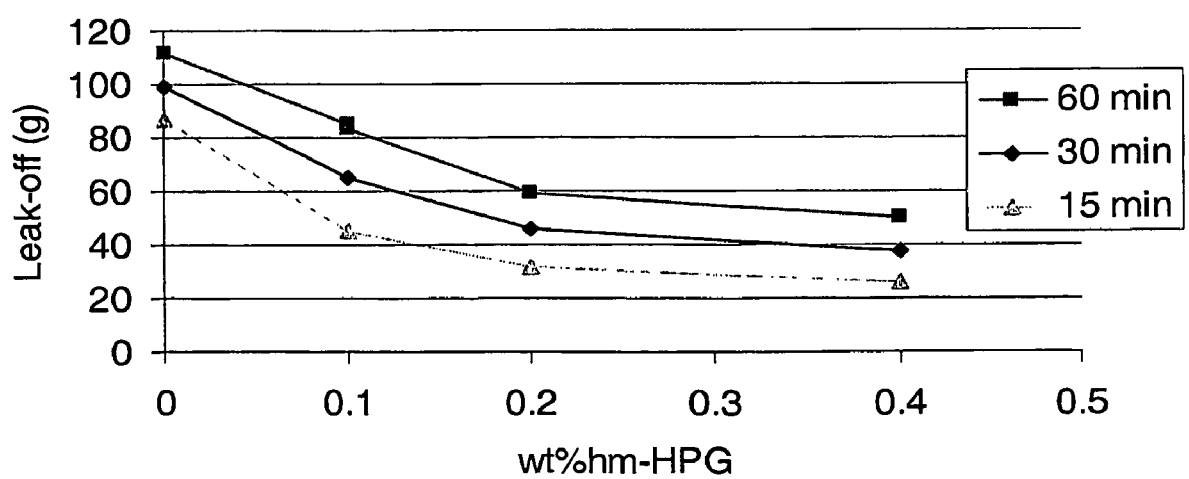
Figure 21:
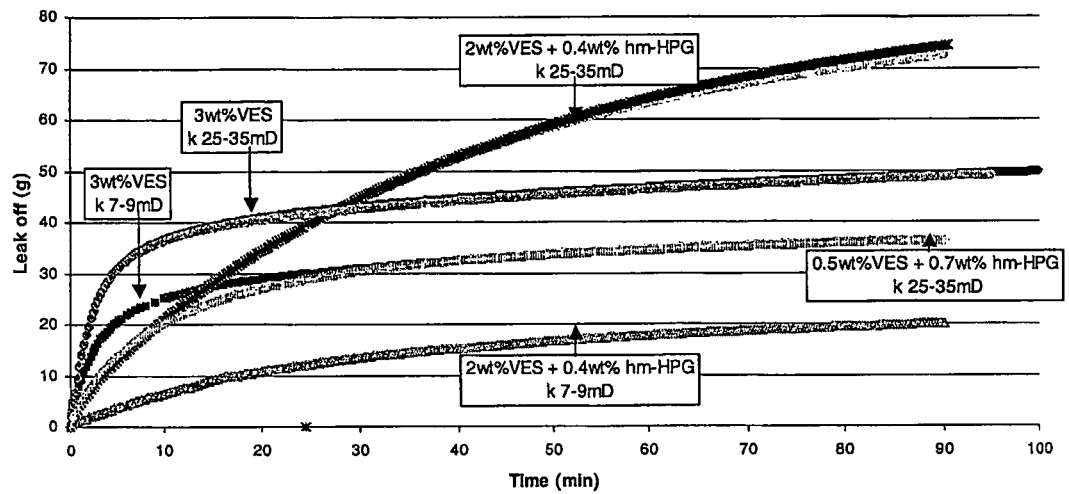
Figure 22:
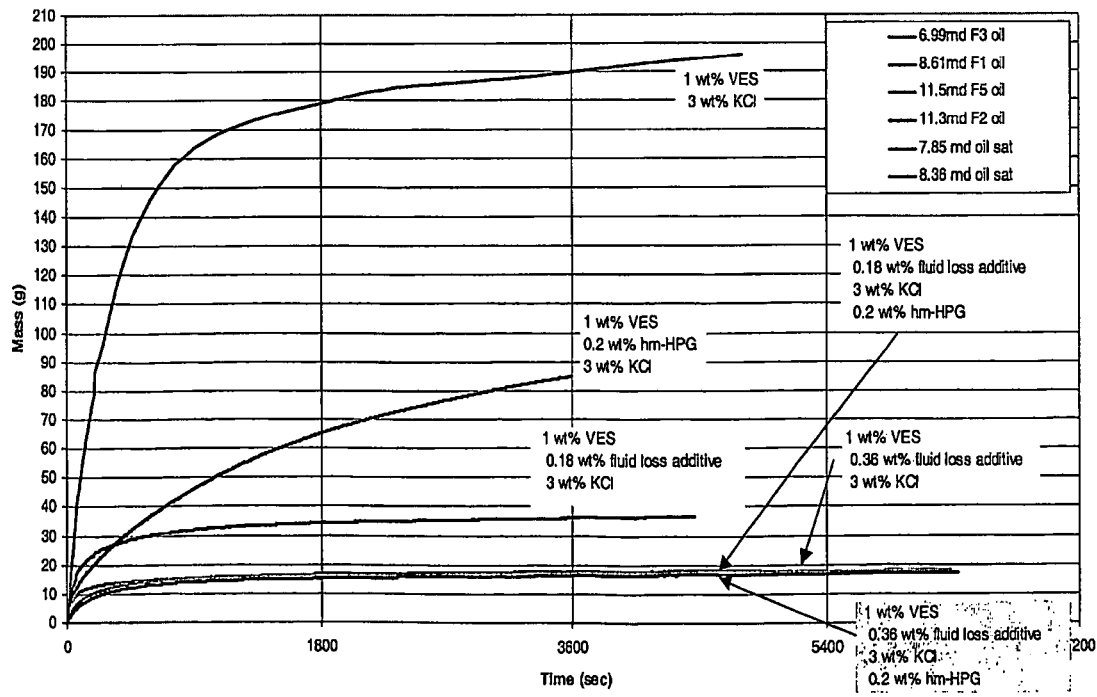

the FIG. 2 compares the overlap concentrations of a cationic viscoelastic surfactant at 25, 40 and 60° C.;

the FIG. 3 compares the overlap concentrations and the entanglement concentrations of a hydrophobically-modified polymer at 25, 40, 60 and 80° C.;

the FIG. 4 compares the viscosity of different fluids as a function of a cationic viscoelastic surfactant concentration, for various hydrophobically-modified hydroxypropyl guar concentrations, at a high shear rate of 100 s$^{-1}$;

the FIG. 5 shows three bottles. It illustrates the delayed formation of emulsions for a fluid according to the invention compared to equivalent fluids without the hydrophobically-modified polymer component or without the cationic viscoelastic surfactant component;

the FIG. 6 compares the variations of viscosity of cationic viscoelastic surfactant fluids comprising various concentrations of hydrophobically modified hydroxypropyl guar as a function of time and it permits to measure the breaking time and viscosity of said fluids, upon contact with hydrocarbons;

the FIG. 7 shows two bottles that illustrate the need of pendant hydrophobic chains on polymer backbone to create a stabilising interaction between the polymer network and the surfactant network and thereby to avoid a phase separation;

the FIGS. 8 and 9 compare the viscosity of a fluid comprising a hydrophobically-modified polymer and a cationic viscoelastic surfactant with a corresponding fluid comprising an anionic viscoelastic surfactant, as a function of the surfactant concentration;

the FIG. 10 compares the variations of the viscosity of fluids comprising a hydrophobically-modified polymer and/or a cationic viscoelastic surfactant as a function of temperature, at 140° C. and at a high shear rate of 100 s$^{-1}$;

the FIG. 11 compares the variations of the viscosity of fluids comprising a hydrophobically-modified polymer and/or a zwitterionic viscoelastic surfactant at different salt concentrations as a function of the concentration of the zwitterionic viscoelastic surfactant, at a high shear rate of 100 s$^{-1}$;

the FIG. 12 compares the variations of the viscosity of fluids comprising a zwitterionic viscoelastic surfactant and/or a hydrophobically-modified polymer as a function of temperature, at a high shear rate of 100 s$^{-1}$;

the FIG. 13 shows a route for synthesis of a hydrophobically-modified poly(ethylene-alt-maleic anhydride);

the FIG. 14 compares the viscosity of four fluids comprising a hydrophobically-modified polymer and a viscoelastic surfactant as a function of the temperature;

the FIG. 15 shows a route for synthesis of a hydrophobically-modified chitosan;

the FIG. 16a compares the variations of the zero shear viscosity of various fluids comprising a hydrophobically-modified chitosan and/or a viscoelastic surfactant as a function of the hydrophobically-modified chitosan concentration, at 25° C.;

the FIG. 16b compares the variations of the zero shear viscosity of various fluids comprising a hydrophobically-modified chitosan and/or a viscoelastic surfactant as a function of the hydrophobically-modified chitosan concentration, at 60° C.;

the FIG. 17 compares the variations of the leak-off volume of viscoelastic fluids and of viscoelastic fluids comprising a hydrophobically modified polymer, in brine saturated core at a brine permeability range 7-9 mD, versus time;

the FIG. 18 compares the variations of the leak-off volume of viscoelastic fluids, in brine saturated core or in oil saturated core, at a brine permeability range 7-9 mD, versus time;

the FIG. 19 compares the variations of the leak-off volume of viscoelastic fluids comprising a hydrophobically modified polymer, in brine saturated core or in oil saturated core, at a brine permeability range 7-9 mD, versus time;

the FIG. 20 compares the effect of the hydrophobically modified polymer concentration on the leak-off rate of hydrophobically-modified polymer/viscoelastic surfactant fluids;

the FIG. 21 compares the variations of the leak-off volume versus time of viscoelastic surfactant fluids comprising hydrophobically modified polymer or not in oil saturated core for two permeability ranges; and the FIG. 22 compares the variations of the leak-off volume versus time of viscoelastic fluids comprising hydrophobically modified polymer or not in oil saturated core using fluid loss additives or not.

DETAILED DESCRIPTION

The present invention concerns an aqueous fluid for use in the recovery of hydrocarbons such as oil and gas. This aqueous fluid is a fracturing fluid.

The fluid of the invention comprises a viscoelastic surfactant and a hydrophobically-modified polymer.

The surfactant is said viscoelastic because, unlike numerous surfactants, which form Newtonian solutions with a viscosity slightly higher than water even at high concentrations, it is capable of forming viscoelastic fluids at a lower concentration. This specific rheological behaviour is mainly due to the types of surfactant aggregates that are present in the fluids. In low viscosity fluids, the surfactant molecules aggregate in spherical micelles whereas, in viscoelastic fluids, long micelles, which can be described as worm-like, thread-like or rod-like micelles, are present and entangle.

The viscoelastic surfactant of the invention is usually ionic. It may be cationic, anionic or zwitterionic depending on the charge of its head group. When the surfactant is cationic, it is associated with a negative counterion, which can be an inorganic anion such as a sulfate, a nitrate, a perchlorate or a halide such as Cl$^-$, Br$^-$ or with an aromatic organic anion such as salicylate, naphthalene sulfonate, p and m chlorobenzoates, 3,5 and 3,4 and 2,4-dichlorobenzoates, t-butyl and ethyl phenate, 2,6 and 2,5-dichlorophenates, 2,4,5-trichlorophenate, 2,3,5,6-tetrachlorophenate, p-methyl phenate, m-chlorophenate, 3,5,6-trichloropicolinate, 4-amino-3,5,6-trichlorpicolinate, 2,4-dichlorophenoxyacetate. When the surfactant is anionic, it is associated with a positive counterion, for example, Na$^+$ or K$^+$. When it is zwitternionic, it is associated with both negative and positive counterions, for example, Cl$^-$ and Na$^+$ or K$^+$.

The viscoelastic surfactant may be, for example, of the following formulae:

R—Z where R is the hydrophobic tail of the surfactant, which is a fully or partially saturated, linear or branched hydrocarbon chain of at least 18 carbon atoms and Z is the head group of the surfactant which can be —NR$_1$R$_2$R$_3$$^+$, —SO$_3$$^-$, —COO$^-$ or, in the case where the surfactant is zwitterionic, —N$^+$(R$_1$)(R$_2$)R$_3$—COO$^-$ where R$_1$, R$_2$, and R$_3$ are each independently hydrogen or a fully or partially saturated, linear or branched, aliphatic chain of at least one carbon atom; and where R$_1$ or R$_2$ can comprise a hydroxyl terminal group.

It may be, in another example, a cleavable viscoelastic surfactant of the following formulae, which is disclosed in the application filed on the 13th of Feb. 2001 under the number GB 0103449.5 not published at the priority date of the present application:

R—X—Y—Z where R is the hydrophobic tail of the surfactant, which is a fully or partially saturated, linear or branched hydrocarbon chain of at least 18 carbon atoms, X is the cleavable or degradable group of the surfactant which is an acetal, amide, ether or ester bond, Y is a spacer group which is constituted by a short saturated or partially saturated hydrocarbon chain of n carbon atoms where n is at least equal to 1, preferably 2 and, when n is $\geq$3, it may be a straight or branched alkyl chain, and Z is the head group of the surfactant which can be —NR$_1$R$_2$R$_3$$^+$, —SO$_3$$^-$, —COO$^-$ or, in the case where the surfactant is zwitterionic, —N$^+$(R$_1$R$_2$R$_3$—COO$^-$) where R$_1$, R$_2$ and R$_3$ are each independently hydrogen or a fully or partially saturated, linear or branched, aliphatic chain of at least one carbon atom, possibly comprising a hydroxyl terminal group. Due to the presence of the cleavable or degradable group, cleavable surfactants are able to degrade under downhole conditions.

A cationic viscoelastic surfactant suitable for the implementation of the invention is the N-erucyl-N,N-bis(2-hydroxyethyl)-N-methyl ammonium chloride. In an aqueous solution comprising 4 wt % NaCl or 3 wt % KCl, this viscoelastic surfactant forms a gel containing worm-like micelles that entangle at concentrations between 1.5 and 4.5 wt %. These worm-like micelles degrade in spherical micelles when the gel is broken by hydrocarbon.

Anionic viscoelastic surfactants suitable for the implementation of the invention are monocarboxylates RCOO$^-$ such as oleate where R is C$_{17}$H$_{33}$ or di- or oligomeric carboxylates such as disclosed in the patent application filed on the 11 Jul. 2001 under the number PCT/GB01/03131 not published at the priority date of the present application. These mono-, di- or oligomeric carboxylates form viscoelastic gels when in alkaline solution in the presence of added salts such as potassium chloride (KCl) or sodium chloride (NaCl). Worm-like micelles of said gel degrade to spherical micelles when the gel is broken by hydrocarbon.

Zwitterionic surfactants suitable for the implementation of the invention can be betaine surfactants having the general formula R—N(R$_1$R$_2$)—Z where Z is an alkyl group or R—CN(R$_1$R$_2$R$_3$)—Z where Z is an acyl group. The hydrophobic group R can be aliphatic or aromatic, straight or branched, saturated or unsaturated. The anionic group Z of the surfactant can be —R'—SO$_3$$^-$, —R'—COO$^-$ where R' is a saturated aliphatic chain. R$_1$, R$_2$ and R$_3$ are each independently hydrogen or an aliphatic chain of at least one carbon atom.

The hydrophobic-modified polymer is soluble in water. It has an average molecular weight comprised between 10,000 and 10,000,000 g/mol and, preferably, between approximately 100,000 and approximately 2,000,000 g/mol. Above 2,000,000 and, definitely, above 10,000,000 g/mol, the polymer may form structures which are difficult to remove from the fracture during the subsequent backflow of formation fluids. Under 100,000 and, definitely, under 10,000 g/mol, the polymer concentration that would be necessary to obtain a fluid of the invention is likely to be too high hence increasing considerably the fluid associated costs.

The hydrophobically-modified polymer has a principal backbone and, grafted on said principal backbone, randomly or not, at a substitution degree range comprised between 0.01 and 10 and, preferentially, between approximately 0.03 and approximately 5 weight percent, pendant hydrophobic chains. The polymer can be charged or non-charged, the charges being positive or negative and being located on the polymer backbone or on the pendant hydrophobic chains. If the hydrophobic substitution degree of the hydrophobically-modified polymer is too high, its solubility in water decreases. If it is too low, it becomes difficult to obtain a stable fluid with a sufficient viscosity. In fact, the substitution degree of the hydrophobically-modified polymer is adjusted with a view to obtain a satisfactory fluid viscosity with a sufficient polymer water solubility.

The principal polymer backbone can be of a biological nature. It can be, notably, a polysaccharide. Suitable polysaccharides for the implementation of the invention are starch or starch derivatives such as starch phosphate, starch succinate, aminoalkyl starch or hydroxypropyl starch; cellulose or cellulose derivatives as carboxymethyl cellulose, methyl cellulose, ethyl cellulose or hydroxypropylmethyl cellulose; chitin or chitin derivatives such as the chitosan or chitosan derivatives such as the N-carboxybutyl chitosan or the N-carboxymethyl chitosan; galactomannans, in particular, guar and guar derivatives as the carboxymethyl guar or the carboxymethyl hydroxypropyl guar derivatives. It can also be a synthetic polymer such as a polyanhydride, for example the poly(isobutylene-alt-maleic anhydride), the poly(ethylene-alt-maleic anhydride), the poly(ethylene-graft-maleic anhydride), a polyacrylamide, a polyacrylate, a polyacrylate/polyacrylamide copolymer, a polyether, a polyester, a polyamide or a polyvinylalcohol.

The pendant hydrophobic chains are preferentially fully or partially saturated linear or branched hydrocarbon chains comprising preferably approximately 12 to 24 carbon atoms and including advantageously a cleavable or degradable group such as an acetal, an amide, an ether or an ester bond.

An example of a non-charged hydrophobically-modified polymer, which appears convenient for the implementation of the invention, is a guar hydrophobically modified by non charged alkyl chains.

An example of a positively charged hydrophobically-modified polymer, where the charges are located on the polymer backbone, which also appears convenient for the implementation of the invention, is a hydrophobically-modified chitosan. This polymer can be synthesized with various hydrophobic substitution degrees following the route described by Yalpani, M. and Hall, L. D. *Macromolecules*, 1984, vol. 17, p. 272 which produces N-alkylated chitosan by reductive amination of the free amino groups of the chitosan as presented in FIG. 15 or, following the route described in D. Plusquellec and al., ENSCR, Departement de Chimie Organique, An Efficient Acylation of Free Glycosylamines for the Synthesis of N-Glycosyl Amino Acids and N-Glycosidic Surfactants for Membranes Studies, *J. Carbohydrate Chemistry*, 1994, 13(5), 737-751, which, in such case, produces N-acylated chitosan with cleavable hydrophobic chains.

Further examples of hydrophobically-modified polymers suitable for the implementation of the invention are hydrophobically-modified polyanhydrides, which can be obtained by an amidation or an esterification reaction of a polyanhydride such as a poly(isobutylele-alt-maleic anhydride), a poly(ethylene-alt-maleic anhydride) or a poly(ethylene-graft-maleic anhydride), with, respectively, an amine or an alcohol chain comprising between approximately 12 and approximately 24 carbon atoms. These hydrophobically-modified polyanhydrides comprise carboxylic groups attached to their backbone, each carboxylic group being associated with one pendant hydrophobic chain. As a result, the hydrophobically-modified polyanhydrides are not only hydrophobic but also hydrophilic. Preferentially, the chemical structure of the pendant hydrophobic chains corresponds to and, more preferentially, matches the hydrophobic tail of the surfactant molecules of the fluid. In such case, the whole chemical structure of the pendant hydrophobic chain and its associated carboxyl group forms an amphiphilic structure corresponding to or matching the surfactant molecule structure, said carboxylic group being analogous to the charged hydrophilic head of the surfactant molecule.

The FIG. 13 shows a poly(ethylene-alt-maleic anhydride) hydrophobically modified by oleyl pendant chains and a route for the synthesis of this hydrophobically-modified polymer. As shown on said figure, the hydrophobically-modified poly(ethylene-alt-maleic anhydride) comprises a carboxylic group —COO$^-$ attached to the carbon atom immediately adjacent to the carbon atom where is grafted the hydrophobic oleyl pendant chain. Thus, both the hydrophilic and hydrophobic structures of the viscoelastic surfactant is matched to the local structure of the hydrophilic and the hydrophobic groups on the polymer. In addition, the oleyl pendant chain comprises an amide bond, which is cleavable or degradable.

In addition to the surfactant and the hydrophobically-modified polymer, the fluid of the invention may comprise salts including, for example, inorganic salts such as the chlorides of ammonium, sodium and potassium present in concentrations of 1-10 wt % but typically 3 or 4 wt % or organic salts such as sodium salicylate. The fluid may also contain an organic solvent such as, for example, isopropanol, which may be used to liquefy the viscoelastic surfactant component. The fluid may also contain some fluid loss additive such as mixture of starch and mica in order to reduce fluid loss.

The fluid of the invention is viscoelastic. For example, the viscoelasticity of the fluid may be measured by carrying out dynamic oscillatory rheological measurements on the composition as generally described in Barnes H. A. et al., *An Introduction to Rheology*, Elsevier, Amsterdam (1997). In a typical dynamic oscillatory experiment, the composition is sheared sinusoidally according to the following equation (1):

$$\gamma(t) = \gamma_{(max)} \sin \omega t \quad (1)$$

Where $\gamma(t)$ is the strain, $\gamma(max)$ is the maximum strain, t is time and $\omega$ is the angular frequency. The shear stress, $\sigma$, is given by:

$$\sigma(t) = \sigma_{(max)} \sin(\omega t + \delta) \quad (2)$$

where $\delta$ is the phase angle.

The relative inputs given by the elastic component (G') and viscous component (G") are resolved as follows. Expanding the sine function in equation (2) gives equations (3) and (4) as follows:

$$\sigma(t) = \sigma_{(max)}[\sin \omega t \cos \delta + \cos \omega t \sin \delta] \quad (3)$$

$$\sigma(t) \equiv \gamma_{(max)}[G' \sin \omega t + G'' \cos \omega t] \quad (4)$$

where $G' \equiv (\sigma_{(max)}/\gamma_{(max)})\cos \delta$ and $G'' \equiv (\sigma_{(max)}/\gamma_{(max)})\sin \delta$.

Equation (4) therefore defines two dynamic moduli: G', the storage modulus or elastic component and G", the loss modulus or viscous component of a composition having viscoelastic properties.

The fluid of the present invention is an aqueous viscoelastic gel, where the term "viscoelastic gel" as used herein means a composition in which the elastic component (G') is at least as important as the viscous component (G"). In the evolution from a predominantly viscous liquid to a viscoelastic gel, the gel point can be defined by the time when the contribution from the elastic and viscous components becomes equal, i.e. G'=G"; at and beyond this point in time, G'≧G" and the phase angle, $\delta$ is ≧45°.

Figure 1:
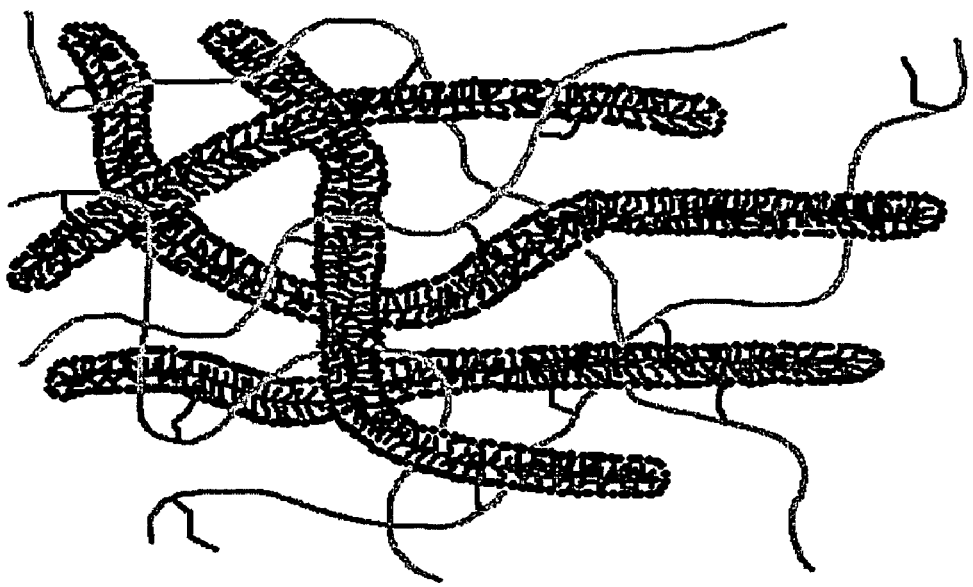

The viscoelasticity of the fluid of the invention is due to interactions between the hydrophobically-modified polymer and the surfactant "long" (i.e. worm-like, thread-like or rod-like) micelles. The hydrophobically-modified polymer and, notably, pendant hydrophobic chains of the polymer, interact with the long micelles formed by the viscoelastic surfactant. These interactions, which are schematically illustrated in the FIG. 1, are physical hydrophobic-hydrophobic interactions.

As a result, an overlapping network is created.

Micelles are formed at very low surfactant concentration in water; the critical micelle concentration (c.m.c.) is the concentration at which micelles, practically spherical, start to form. The c.m.c. is commonly measured by surface tension, solubilisation, conductivity in the case of ionic surfactants, self-diffusion or NMR.

To form the overlapping network, the viscoelastic surfactant concentration is above its critical micelle concentration (c.m.c.).

The overlap concentration c* of a viscoelastic surfactant is obtained by plotting the log of the zero shear viscosity of a water-based fluid comprising said viscoelastic surfactant as a function of the log of its concentration. A non-linear relationship is obtained and c* is the viscoelastic surfactant concentration which corresponds to the inflexion or break point between the two linear slopes formed by this curve (FIG. 2).

Advantageously, the viscoelastic surfactant concentration is below 10 wt %, preferentially, below 5 wt % and below 20×c* where c* is the overlap concentration of said viscoelastic surfactant. More preferentially, it is comprised between 0.2 c* and 5×c*. This corresponds to viscoelastic surfactant concentrations far below the viscoelastic surfactant concentration used in viscoelastic surfactant fracturing fluids of the prior art, which are of the order of 30-40×c*.

The plot of the log of the zero shear viscosity of the hydrophobically-modified polymer fluid as a function of the log of its concentration is characterised by two critical concentrations: (1) the overlap concentration c* and (2) the entanglement concentration $c_e$. A curve is obtained and c* and $c_e$ are the hydrophobically-modified polymer concentrations which correspond to the two breaks points of the three slopes formed by this curve. The dilute regime is defined for hydrophobically-modified polymer concentrations c<c*. At such concentrations c, the zero shear viscosity is of the order of that of the solvent. The semi dilute unentangled regime is defined for hydrophobically-modified polymer concentrations strictly comprised between c* and $c_e$. At such concentrations c, the viscoelasticity of the fluid is controlled by Rouse dynamics and the viscosity increases moderately. The semi dilute entangled regime is defined for hydrophobically-modified polymer concentrations c>$c_e$. At such concentrations c, the viscosity of the fluid can be described by the reptation model.

In the overlapping network of the fluid according to the invention, the hydrophobically-modified polymer concentration is below its entanglement concentration and above its overlap concentration c*.

Some interactions between polymers and surfactant molecules have been studied and corresponding results can be found in M. A. Winnik and A. Yekta, Associative polymers in aqueous solution, *Current Opinion in Colloid & Interface Science*, 1997, 2:424-436; U. Kästner and R. Zana, Interactions between quaternary ammonium surfactant oligomers and water-soluble modified guars, *Journal of Colloid and Interface Science*, 1999, 218:468-479; S. Biggs, J. Selb and F. Candau, Effect of surfactant on the solution properties of hydrophobically modified polyacrylamide, *Langmuir*, 1992, 838-847; A. Hill, F. Candau and J. Selb, Aqueous solution properties of hydrophobically associating copolymers, *Progress in Colloid & Polymer Science*, 1991, 84:61-65; O. Anthony, C. M. Marques and P. Richetti, Bulk and surface behavior of cationic guars in solutions of oppositely charged surfactants, *Langmuir*, 1998, 14:6086-6095; I. Iliopoulos, Association between hydrophobic polyelectrolytes and surfactants, *Current Opinion in Colloid & Interface Science*, 1998, 3:493-498; S. Panmai, R. K. Prud'homme and D. Peiffer, Rheology of hydrophobically modified polymers with spherical and rod-like surfactant micelles, Department of Chemical Engineering, Princeton University, Princeton, N.J., Exxon Research and Engineering Company, Annondale, N.J., 1997; and the patents published under the numbers U.S. Pat. No. 4,975,482, U.S. Pat. No. 5,036,136 and U.S. Pat. No. 6,194,356. The teachings of these studies may, in some cases, be useful for the understanding of the interactions existing in the fluid of the invention.

The fluid of the invention is hydrocarbon-responsive so that the gel structure breaks down on contact or mixing with hydrocarbons. The long viscoelastic surfactant micelles, which form, together with the hydrophobically-modified polymer, the gel network, degrade on contact with hydrocarbons to form spherical micelles. The hydrophobically-modified polymer concentration, which is under ce, is not sufficient to form an entangled network. Then, the viscosity of the gel decreases to value of about 100 cP or below, preferentially, 20 cP, at a high shear rate.

The fluid of the invention has preferentially a leak-off rate, which is below the leak-off rate of pure viscoelastic surfactant fluids of equivalent rheology. This is a very significant advantage: as a result, the responsive fluid of the invention can be used to fracture higher permeability formations as compared to the pure viscoelastic surfactant fluids. It is likely that, after gel degradation by interaction with hydrocarbons, the polymer component may hinder fracture clean-up relative to the pure viscoelastic surfactant fluid. However, it is also noted that the clean-up performance of the fluid of the invention is likely to be similar or better than that observed for a low concentration linear polymer fracturing fluid, i.e. the clean-up should be acceptable and superior to higher concentration linear polymer fluids or covalently crosslinked polymer fluids.

Practically, all compounds of the fluid of the invention are blended at surface together with the proppant, which can be, for example, a 20-40 mesh sand, bauxite or glass beads. When subjected to a very high shear rate, the viscosity of this fluid is sufficiently low to allow its pumping downhole. There, the pumped fluid, carrying the proppant, is injected into the formation rocks to be fractured under a high pressure. At that time, the fluid of the invention is sufficiently viscous for carrying the proppant through the fracture. The fluid then degrades by contact with hydrocarbons flowing through the fracture.

EXAMPLE 1

Determination of the Overlap Concentrations c* of a Viscoelastic Surfactant for Various Temperatures On FIG. 2 is plotted the zero shear viscosity of an aqueous solution of N-erucyl-N,N-bis(2-hydroxyethyl)-N-methyl ammonium chloride in 3 wt % of potassium chloride as a function of the concentration, calculated in wt %, of N-erucyl-N,N-bis(2-hydroxyethyl)-N-methyl ammonium chloride, at 25, 40 and 60° C.

Three curves are obtained. From these curves, it can be deduced the critical overlap concentration of the viscoelastic surfactant c* is equal to 0.08 wt % at 25° C., 0.1 wt % at 40° C. and 0.15 wt % at 60° C. It is reasonable that c* increases with temperature as the average length of the worm-like micelles is expected to decrease with increasing temperature.

EXAMPLE 2

Determination of the Overlap Concentrations c* and the Entanglement Concentrations $c_e$ of a Hydrophobically Modified Polymer, for Various Temperatures On FIG. 3 is plotted the zero shear viscosity of an aqueous solution of a hydrophobically-modified hydroxypropyl guar (hm-HPG) in 3 wt % of potassium chloride as a function of the concentration, calculated in wt %, of said hydrophobically-modified polymer, at 25, 40, 60 and 80° C. The hydrophobically modified hydroxypropyl guar has a molecular weight around $0.5 \times 10^6$ g/mol and contains between 0.03 and 1.7 wt % of pendant linear hydrocarbon chains of 22 carbon atoms.

Four curves are obtained. The critical overlap concentrations c* of the hydrophobically-modified hydroxypropyl guar as well as the entanglement concentrations $c_e$ are deduced from these curves. c*, which corresponds to the break point of the two first slopes of each curve, is equal to 0.1±0.05 wt % at 25, 40, 60 and 80° C. $c_e$, which correspond to the break point of the second and third slopes of each curve, is equal to 0.35±0.05 wt % at 25, 40 60 and 80° C. Generally, it will be considered that the word "approximately", as applied to c* or $c_e$, means c*±0.05 wt % or $c_e$±0.1 wt %.

EXAMPLE 3

Rheology of a Pure Viscoelastic Surfactant Fluid Compared to the Rheology of a same Viscoelastic Surfactant Fluid Comprising Various Concentrations of a Hydrophobically-modified Polymer On FIG. 4 is plotted the viscosity, under a high shear rate of 100 s$^{-1}$, of aqueous solutions of hydrophobically-modified hydroxypropyl guar of different concentrations 0, 0.1, 0.2, 0.4 or 0.7 wt % blend with N-erucyl-N,N-bis(2-hydroxyethyl)-N-methyl ammonium chloride in 3 wt % potassium chloride as a function of the concentration, calculated in wt %, of said N-erucyl-N,N-bis(2-hydroxyethyl)-N-methyl ammonium chloride, at 80° C. The hydrophobically-modified hydroxypropyl guar has a molecular weight around 0.5×10$^6$ g/mol and comprises between 0.03 and 1.7 wt % of pendant linear hydrocarbon chains of 22 carbon atoms.

The plot of the FIG. 4 illustrates that, by adding a small quantity of the hydrophobically-modified hydroxypropyl guar (hm-HPG) to the aqueous solution of N-erucyl-N,N-bis(2-hydroxyethyl)-N-methyl ammonium chloride, the viscosity of the blend fluid becomes much higher compared to that of the fluid comprising the pure N-erucyl-N,N-bis(2-hydroxyethyl)-N-methyl ammonium chloride considered at the same concentration.

Obtaining a fluid with a viscosity of 100 cP at high shear rate (100 s$^{-1}$) requires 2.3 wt % of N-erucyl-N,N-bis(2-hydroxyethyl)-N-methyl ammonium chloride. The concentration of the viscoelastic surfactant can be decreased by a factor of 7.5 by adding 0.4 wt % hm-HPG to 0.3 wt % of aqueous solution of the viscoelastic surfactant. Considering the respective costs of each component, the cost of the blend fluid is approximately 4 times cheaper than the cost of the pure viscoelastic surfactant fluid.

EXAMPLE 4

Fluid Responsiveness to Hydrocarbons

The fluid responsiveness to hydrocarbons has been tested using a bottle test. This test has been performed for three different fluids in the presence of oil (mineral spirits of a boiling point fraction comprised between 179 and 210° C.). A volume of each fluid was placed in a bottle and the same volume of oil was placed on top of the gel. Each bottle was closed and heated in an oven at 60° C. for one hour. Each bottle was then visually inspected to determine if the gel had broken to its base viscosity. If not broken, gelled samples were shaken vigorously for 20 seconds and the bottles replaced in the oven for a further hour. This procedure was repeated until the gels had broken and the total time taken to this procedure was noted. Once the gel had broken, the bottles were heated and shaked for a further period of 3 to 6 hours period to determine if any emulsification was observable.

The first fluid was an aqueous fluid comprising 0.7 wt % hydrophobically-modified hydroxypropyl guar and 3 wt % KCl. The hydrophobic-modified hydroxypropyl guar has a molecular weight around 0.5×10$^6$ g/mol and contains between 0.03 and 1.7 wt % of pendant linear hydrocarbon chains of 22 carbon atoms. The second fluid was an aqueous fluid made of 3 wt % of N-erucyl-N,N,bis(2-hydroxyethyl)-N-methyl ammonium chloride and 3 wt % KCl and the third fluid was an aqueous fluid made of 0.7 wt % of the hydrophobically-modified hydroxypropyl guar, 3 wt % of N-erucyl-N,N,bis(2-hydroxyethyl)-N-methyl ammonium chloride and 3 wt % KCl.

By contact with oil, all the gels were broken after 2 to 3 hours and, in each bottle, we can see two clear phases, a lower phase comprising the broken gel and an upper phase comprising the oil. However, in the bottle containing the third fluid, which is shown, in the FIG. 5, on the left, the oil phase appears clear and very little emulsion was observable whereas, in the two other bottles, the oil phase appears cloudy due to an emulsion phase. After a prolonged period of time, an emulsion forms in the third fluid.

Thus, the surfactant and hydrophobically-modified polymer containing aqueous fluid is responsive to hydrocarbon and emulsion formation after breaking is delayed.

In FIG. 6 is plotted the viscosity of hm-HPG/viscoelastic surfactant fluids versus the breaking time for various hm-HPG concentrations, 0.1, 0.4 and 0.8 wt %, and various viscoelastic surfactant concentrations, 1, 2 and 3 wt %. The blends comprising a hm-HPG concentration equal or below c* break to a very low viscosity, similar to those of the pure viscoelastic surfactant fluids of equivalent initial viscosity. However, those with higher polymer concentrations (particularly when $c > c_e$) show a relatively high viscosity after breaking equal to the viscosity of the corresponding non hydrophobically-modified hydroxypropyl guar (HPG).

EXAMPLE 5

The Requirement for Pendant Hydrophobic Chains

A first bottle, shown on the left side of the FIG. 7, was filled with a first blend of 0.7 wt % of the hydrophobically-modified hydroxypropyl guar of example 2, 1 wt % of the viscoelastic surfactant of example 1 and 3 wt % of potassium chloride. A second bottle, shown on the right side of the FIG. 7 was filled with a second blend of 0.7 wt % of the corresponding non hydrophobically-modified hydroxypropyl guar, 1 wt % of the viscoelastic surfactant used in the example 1 and 3 wt % KCl.

One phase only can be distinguished in the first bottle whereas, in the second, two phases are present. Therefore, in the first bottle there is no phase separation as the hydrophobic associations between the hydrophobically-modified polymer and the viscoelastic surfactant stabilize the blend whereas, in the second bottle, there is a phase separation as there is no stabilizing interaction between the non-modified polymer and the viscoelastic surfactant.

EXAMPLE 6

Comparison Between Anionic and Cationic Surfactant Containing Fluids

On FIG. 8 is plotted the viscosity of an aqueous fluid comprising 0.6 wt % of the hydrophobically-modified hydroxypropyl guar of the example 2 and either, the cationic surfactant N-erucyl-N,N-bis(2-hydroxyethyl)-N-methyl ammonium chloride or the anionic surfactant dimer acid potassium chloride $C_{36}H_{68}O_4K_2$ as a function of the surfactant concentration, at 80° C. and under a high shear rate of 100 s$^{-1}$.

The viscosity of the fluid containing the anionic surfactant is not as effective as the one obtained with the fluid containing the cationic surfactant. It is believed that this is due to differences in surfactant aggregate structures rather than to the difference in charge. The cationic surfactant can form worm-like micelles at 80° C. whereas the anionic dimer cannot. A blend containing the same hydrophobically-modified guar but, with an anionic surfactant which forms worm-like micelles at 80° C., was then evaluated. The anionic surfactant is the oleyl amide succinate $C_{22}H_{40}NO_3^{31}$ $Na^+$. The data are shown in FIG. 9. It can be now observed that the hydrophobically-modified polymer/cationic surfactant and hydrophobically-modified polymer/anionic surfactant blends have a similar viscosity. This result confirms that it is the surfactant aggregate structure rather than the charge of the surfactant which influence its interaction with the hydrophobically-modified polymer.

In addition, tests identical to those of the example 4 were performed using the above fluids. It was shown that these fluids are responsive to hydrocarbons and that the emulsion formation was delayed.

EXAMPLE 7

Viscosity Performance, Versus Temperature, of a Blend Compared to that of Pure Polymer and Pure VES Fluids On FIG. 10 is plotted the viscosity of, either,—an aqueous fluid comprising 0.4 wt % of the hydrophobically-modified hydroxypropyl guar of example 2 and 3 wt % KCl,—an aqueous fluid comprising 2 wt % of the cationic surfactant N-erucyl-N,N-bis(2-hydroxyethyl)-N-methyl ammonium chloride and 3 wt % KCl,—an aqueous fluid comprising 0.4 wt % of the hydrophobically-modified hydroxypropyl guar of example 2 and 2 wt % of N-erucyl-N,N-bis(2-hydroxyethyl)-N-methyl ammonium chloride with 3 wt % of potassium chloride, or—an aqueous fluid comprising 0.7 wt % of the hydrophobically-modified hydroxypropyl guar of the example 2 and 2 wt % of N-erucyl-N,N-bis(2-hydroxyethyl)-N-methyl ammonium chloride with 3 wt % of potassium chloride, as a function of temperature, under a high shear rate of 100 s$^{-1}$.

It appears that the viscosities of the pure viscoelastic surfactant fluid and of the pure polymeric fluid drop when the temperature is increased above 80° C. whereas the viscosity of the hm-polymer/viscoelastic surfactant system is still high (above 50 cP up to about 110° C.). This still improves when increasing hydrophobically-modified polymer concentrations.

EXAMPLE 8

Fluid Viscosity Variations as a Function of Different Parameters as the Temperature, the Salt Concentration On FIG. 11 is plotted the viscosity, under a high shear rate of 100 s$^{-1}$, of aqueous solutions of a 0.4 wt % of hydrophobically-modified hydroxypropyl guar of example 2 blend with betaine $C_{29}H_{56}N_2^+O_3^-$ in various concentration of potassium chloride (0, 1 and 4 wt %) as a function of the concentration, calculated in wt %, of said betaine, at 140° C. By adding 0.4 wt % of hm-HPG to a 1 wt % betaine fluid in 4 wt % KCL the viscosity is increased from 20 cP to 76 cP. Moreover the salt concentration has no real effect on the blend viscosity.

On FIG. 12 is plotted the viscosity of, either,—an aqueous fluid comprising 0.4 wt % of the hydrophobically-modified hydroxypropyl guar and 0.5 wt % of betaine with 4 wt % of potassium chloride,—an aqueous fluid comprising 0.4 wt % of the hydrophobically-modified hydroxypropyl guar and 1 wt % of betaine with 4 wt % of potassium chloride, or—an aqueous fluid comprising 2 wt % of betaine with 4 wt % of potassium chloride, as a function of temperature, under a high shear rate of 100 s$^{-1}$.

In comparison with the pure betaine, the 2 wt % betaine with 4 wt % KCl fluid has a similar viscosity than the 0.4 wt % hm-HPG with 0.5 wt % betaine and 4 wt % KCl fluid. This is true up to 100° C., above this temperature and up to 140° C. the viscosity of the 2 wt % betaine with 4 wt % KCl is comparable to the one of the 0.4 wt % hm-HPG with 1 wt % betaine and 4 wt % of KCl.

EXAMPLE 9

Fluid Viscosity Variations as a Function of Different Parameters as the Temperature Hydrophobically-modified polyanhydrides of a molecular weight comprised between 100,000 and 500,000 g/mol were synthesized from the base polymer poly(ethylene-alt-maleic anhydride), according to the route presented in the FIG. 13. 1 to 5 wt % of the anhydride units of said hydrophobically-modified polyanhydrides were converted to oleyl amide carboxylate.

These hydrophobically-modified polyanhydrides were blended with oleyl amide succinate, a cleavable surfactant having the same structure as the pendant hydrophobic/hydrophilic chain of the hydrophobically-modified polyanhydride. The oleyl amide succinate surfactant forms rod-like micelles at a concentration of 3 wt %, with 4 to 12 wt % KCl or NaCl.

The overlap concentration c* of the pure hydrophobically-modified polyanhydride has been shown to decrease as the degree of hydrophobic substitution of said hydrophobically-modified polyanhydride increases from 1 to 5%.

In addition, it has been shown that the overlap concentration c* of the pure hydrophobically-modified polyanhydride, decreases upon addition of salt NaCl or KCl. Increasing the ionic strength of the hydrophobically-modified polymer solution is expected to reduce repulsion between the charged sites but it also appears to strengthen the hydrophobe-hydrophobe interactions.

At 80° C. and under a high shear rate of 100 s$^{-1}$, the following viscosities are obtained for the following aqueous fluids, where the viscoelastic surfactant (VES) is the oleyl amide succinate and the hydrophobically-modified polymer (hm-P) is the hydrophobically-modified polyanhydride of the FIG. 13, substituted at 2.5 wt %:

| Aqueous fluid composition | Fluid viscosity at a shear rate of 100 s$^{-1}$ (cP) |
|---|---|
| 4 wt % VES + 8 wt % KCl | 300 |
| 3 wt % hm-P + 8 wt % NaCl | 11.9 |
| 3 wt % hm-P + 0.6 wt % VES + 8 wt % NaCl | 805 |

It appears that the viscosity of a fluid comprising both, the oleyl amide succinate and the hydrophobically-modified polyanhydride is very high, even if the surfactant concentration is quite low.

The FIG. 14 compares the rheograms of aqueous fluids comprising 3 wt % of the hydrophobically-modified polyanhydride of the FIG. 11 with a substitution degree equal to 2.5, 8 wt % NaCl and 0, 0.2, 0.3 or 0.6 wt % of oleyl amide succinate, under a high shear rate of 100 s$^{-1}$, for temperatures comprised between 60 and 150° C.

The viscosity of the fluids comprising 0.2, 0.3 or 0.6 wt % of oleyl amide succinate is well above the viscosity of the fluid without oleyl amide succinate.

EXAMPLE 10

Variations in the Zero Shear Viscosity of Different Fluids Comprising a Hydrophobically-modified Chitosan and/or a Viscoelastic Surfactant as a Function of Hydrophobically-modified Chitosan Concentration Hydrophobically-modified chitosans of a molecular weight around 100,000-500,000 g/mol were synthesized from the base polymer chitosan according to the route presented on the FIG. 15. The substitution degree of the pendant linear hydrocarbon chains of 11 carbon atoms was varied between 1 and 7.5 wt %.

On FIGS. 16a and 16b is plotted the logarithm of the zero shear viscosity of—an aqueous solution comprising hydrophobically-modified chitosan with 5 mol % of hydrophobic substitution (hm5-chitosan) and 3 wt % of potassium chloride,—an aqueous solution of the cationic surfactant N-erucyl-N,N-bis(2-hydroxyethyl)-N-methyl ammonium chloride,—and of an aqueous solution of hm5-chitosan/N-erucyl-N,N-bis(2-hydroxyethyl)-N-methyl ammonium chloride blends, as a function of the hm5-chitosan concentration and keeping the ratio polymer/viscoelastic surfactant equal to one, at 25° C. (FIG. 16a) and 60° C. (FIG. 16b).

FIGS. 16a and 16b illustrate that, by adding a small quantity of N-erucyl-N,N-bis(2-hydroxyethyl)-N-methyl ammonium chloride to the aqueous solution of hm5-chitosan, the viscosity of the blends becomes much higher compared to the one of the pure N-erucyl-N,N-bis(2-hydroxyethyl)-N-methyl ammonium chloride fluid considered at the same concentration or to the one of the pure hm5-chitosan fluid considered at the same concentration.

EXAMPLE 11

Impact of the Saturation State of a Core (Oil or Brine Saturated) on the Static Leak Off of a Hydrophobically-modified Polymer/viscoelastic Surfactant or of a Viscoelastic Surfactant Fluid The leak-off performance of the fluid comprising the hydrophobically modified hydroxypropyl guar of example 2 and N-erucyl-N,N-bis(2-hydroxyethyl)-N-methyl ammonium chloride is compared to the one of the pure viscoelastic surfactant system, at a constant pressure gradient (1000 psi) and temperature (60° C.), using a static leak-off apparatus and a brine-saturated sandstone cores (brine permeability range 7-9 mD) of 1 inch length and 1 inch diameter. From FIG. 17, it can be observed that the data for a pure viscoelastic surfactant system comprising 1 wt % viscoelastic surfactant and 3 wt % KCl are characterised by a high leak-off rate in early time averaging 3.9 mL/min during the period 0 to 10 min followed by a decreased rate averaging around 0.27 mL/min during the period 10 to 40 min. The 60 min leak-off volume is around 50 mL. This pure viscoelastic surfactant system does not form an external filter cake. The addition of 0.2 wt % of the hm-HPG to the 1 wt % viscoelastic surfactant fluid results in a decrease in the early time leak-off rate but the total volume produced after 60 min increases from around 50 to 80 mL.

In contrast to the pure viscoelastic surfactant, an external polymer filter cake is formed by the blend. Only when the added dosage of hm-HPG is increased to 0.5 wt % does the total volume collected during 60 min decrease to from around 50 to around 42 mL.

It appears that the initial saturation state of the core, brine-saturated or partially oil-saturated, has a large impact on leak-off behaviour. At 60 C and at a constant pressure of 1000 psi, the one hour leak-off volume for a 1 wt % viscoelastic surfactant concentration increases from 50 to 190 mL when the initial saturation is changed from a water saturation Sw=1 to an oil saturation So=0.8, the irreducible water saturation Swir being equal to 0.2 (FIG. 18). As the gel enters the core, its structure and viscosity is broken by oil resulting in a higher flow rate. At later time, after the oil has been removed from the core, the flow rate declines to a level similar to that observed for the brine-saturated case. In contrast, under equivalent conditions, the 1 hour leak-off volume of the 1 wt % viscoelastic surfactant and 0.2 wt % hm-HPG blend, which is equal to 80 mL, remains unaffected by the same change in initial saturation state (FIG. 19). It appears that when the hydrophobically-modified polymer is present, the leak-off rate is largely controlled by an external filter cake.

EXAMPLE 12

Effect of the Hydrophobically Modified Polymer Concentration on the Leak-off Rate of Hydrophobically-modified Polymer/viscoelastic Surfactant Fluids The leak-off performance of fluids comprising 2 wt % of the N-erucyl-N,N-bis(2-hydroxyethyl)-N-methyl ammonium chloride, 3 wt % of KCl and various concentration (0.1, 0.2 and 0.4 wt %) of hydrophobically modified hydroxypropyl guar of example 2 are compared, at a constant pressure gradient (1000 psi) and temperature (80° C.), using a static leak-off apparatus and a oil-saturated sandstone cores (brine permeability range 7-9 mD) of 1 inch length and 1 inch diameter.

As shown on FIG. 20, it appears that there is a considerable reduction in leak-off rate when hm-polymer is added to the 2 wt % viscoelastic fluid. There is a dependence of this reduction on the hydrophobically-modified polymer concentration. After 0.5-1 hour, the leak off rate of the 2 wt % viscoelastic fluid is reduced by a factor of 2 by the addition of 0.2 wt % of hm-HPG. The reduction is even higher when the concentration of hm-HPG added is increased.

EXAMPLE 13

Comparison of the Leak Off Performance of a Hydrophobically-modified Polymer/viscoelastic Surfactant Fluid and a Pure Viscoelastic Surfactant Fluid Having a same Viscosity, at Different Brine Permeabilities The leak-off performance, at a constant pressure gradient of 1000 psi and at 60° C., of the hydrophobically-modified hydroxypropyl guar of example 2/N-erucyl-N,N-bis(2-hydroxyethyl)-N-methyl ammonium chloride fluid is compared to the one of the pure viscoelastic surfactant system using a static leak-off apparatus and oil-saturated sandstone cores (brine permeability range 7-9 mD and 25-35 mD) of 1 inch length and 1 inch diameter.

As shown on FIG. 21, for the oil-saturated core, at a permeability range 7-9 mD, there is a considerable reduction in leak-off rate when hm-HPG is added to the viscoelastic surfactant gel. After 60 min, the leak-off volume of a 3 wt % viscoelastic surfactant fluid is equal to 33 mL whereas the leak-off volume of a 2 wt % viscoelastic surfactant and 0.4 wt % hm-HPG fluid, having the same low shear viscosity than the 3 wt % viscoelastic surfactant fluid, is equal to 18 mL. For the oil-saturated core, at a permeability range of 25-35 mD, hm-HPG/viscoelastic surfactant blends are not efficient when using the polymer at the same concentration as for the low permeability.

EXAMPLE 14

Comparison of the Leak Off Performance of a Hydrophobically-modified Polymer/viscoelastic Surfactant Fluid and a Pure Viscoelastic Surfactant Fluid with or without Fluid-loss Additives The leak-off performance, at a constant pressure gradient of 1000 psi and at 60° C., of a fluid comprising 1 wt % of N-erucyl-N,N-bis(2-hydroxyethyl)-N-methyl ammonium chloride and 3 wt % of KCl is compared to the one of the same fluid where 0.18 wt % or 0.36 wt % of fluid loss additive is added. The fluid loss additive is a mixture of starch and mica. The leak-off experiences were performed using a static leak-off apparatus and oil-saturated sandstone cores (brine permeability range 8-9 mD) of 1 inch length and 1 inch diameter.

As shown on FIG. 22, there is a considerable reduction in leak-off rate when fluid loss additive is added to the viscoelastic surfactant fluid. After 60 min, the leak-off volume of the viscoelastic surfactant fluid is equal to 110 mL whereas the leak-off volume of the same fluid with 0.18 wt % of fluid loss additive is equal to 36 mL and to 16.9 mL when 0.36 wt % of fluid loss additive is added.

The leak-off performance, at a constant pressure gradient of 1000 psi and at 60° C., of a fluid comprising 0.2 wt % of hydrophobically-modified hydroxypropyl guar of example 2, 1 wt % of N-erucyl-N,N-bis(2-hydroxyethyl)-N-methyl ammonium chloride and 3 wt % of KCl is compared to the one of the same fluid where 0.18 wt % or 0.36 wt % of fluid loss additive is added. The fluid loss additive is a mixture of starch and mica. The leak-off experiments were performed using a static leak-off apparatus and oil-saturated sandstone cores (brine permeability range 8-9 mD).

As shown on FIG. 22, there is a considerable reduction in leak-off rate when fluid loss additive is added to the blend fluid. After 60 min, the leak-off volume of the blend fluid is equal to 85 mL whereas the leak-off volume of the same fluid with 0.18 wt % of fluid loss additive is equal to 17.6 mL and to 16.2 mL when 0.36 wt % of fluid loss additive is added. The fluid loss additive reduces the permeability of the polymer filter cake and, as a consequence, reduces the leak-off rate.

With 0.18 wt % fluid loss additive, the leak-off volume after one hour, viz. 17.6 mL, for the blend (1 wt % viscoelastic surfactant plus 0.2 wt % hm-HPG) is around half that of the pure viscoelastic surfactant (1 wt % viscoelastic surfactant), viz. 36 mL.

The invention claimed is:

1. Aqueous viscoelastic fracturing fluid for use in the recovery of hydrocarbons, comprising a viscoelastic surfactant and a hydrophobically-modified polymer,
wherein the surfactant comprises a head group and a hydrophobic tail and is of the following formula:

R—X—Y—Z where R is the hydrophobic tail of said viscoelastic surfactant, which is a fully or partially saturated, linear or branched, hydrocarbon chain of at least 18 carbon atoms; X is a degradable acetal, amide, ether or ester bond; Y is a spacer group, formed by a short fully or partially saturated hydrocarbon chain of at least one carbon atom; and Z is the head group of the surfactant which can be —$NR_1R_2R_3^+$, —$SO_3^-$, —$COO^-$ or —$N^+R_1R_2R_3$—$COO^-$ where $R_1$, $R_2$ and $R_3$ are each independently hydrogen or a linear or branched saturated aliphatic chain of at least one carbon atom
and wherein the concentration of the hydrophobically-modified polymer is comprised between, approximately, its overlap concentration c* and, approximately, its entanglement concentration $c_e$, and wherein the viscoelastic surfactant comprises a cleavable viscoelastic surfactant and the hydrophobically-modified polymer comprises one or more cleavable pendant hydrophobic chains.

2. The fluid of claim 1, wherein the viscoelastic surfactant concentration is above its critical micelle concentration.

3. The fluid of claim 1, wherein the viscoelastic surfactant concentration is below 10 wt %.

4. The fluid of claim 3, wherein the viscoelastic surfactant concentration is below 5 wt %.

5. The fluid of claim 1, wherein the viscoelastic surfactant concentration is below 20×c*, where c* is the overlap concentration of said viscoelastic surfactant.

6. The fluid of claim 5, wherein the viscoelastic surfactant concentration is below 10×c*.

7. The fluid of claim 1, further comprising a salt.

8. The fluid of claim 1, wherein the viscoelastic surfactant forms worm-like, thread-like or rod-like micelles.

9. The fluid of claim 1, wherein the viscoelastic surfactant is ionic.

10. The fluid of claim 1, wherein the viscoelastic surfactant is a mono-, a di- or an oligomeric carboxylate.

11. The fluid of claim 1, wherein the viscoelastic surfactant is a oleyl amide succinate $C_{22}H_{40}NO_3^-Na^+$.

12. The fluid of claim 1, wherein the hydrophobically-modified polymer has a principal backbone and said one or more cleavable pendant hydrophobic chains are grafted on said backbone.

13. The fluid of claim 12, wherein the one or more cleavable pendant hydrophobic chains are grafted on the principal backbone at a substitution degree range comprised between 0.01 and 10 and, preferentially, between approximately 0.05 and approximately 5.

14. The fluid of claim 12, wherein the principal polymer backbone is a polysaccharide, a polyanhydride, a polyacrylamide, a polyacrylate, a polyacrylate copolymer, a polyether, a polyester, a polyamide or a polyvinylalcohol.

15. The fluid of claims 12, wherein the one or more cleavable pendant hydrophobic chains are fully or partially saturated linear or branched hydrocarbon chains.

16. The fluid of claim 1, wherein the hydrophobically-modified polymer is a hydrophobically-modified chitosan.

17. The fluid of claim 1, wherein the hydrophobically-modified polymer is a hydrophobically-modified polyanhydride.

18. The fluid of claim 1, wherein said fluid is able to form a gel responsive to hydrocarbons.

19. The fluid of claim 18, wherein gel is able to be broken down on contact or mixing with hydrocarbons.

20. The fluid of claim 19, wherein said gel is able to be broken down, with a viscosity of less than 20 cP in less than 2 hours, under downhole conditions.

21. The fluid of claim 1, wherein said fluid leak-off rate is below the leak-off rate of a pure viscoelastic surfactant fluid of equivalent rheology.

* * * * *